US006738499B1

(12) United States Patent
Doi et al.

(10) Patent No.: US 6,738,499 B1
(45) Date of Patent: May 18, 2004

(54) SYSTEM FOR DETECTION OF MALIGNANCY IN PULMONARY NODULES

(75) Inventors: Kunio Doi, Willowbrook, IL (US); Katsumi Nakamura, Kitakyushu (JP)

(73) Assignee: Arch Development Corporation, Chicago, IL (US)

( * ) Notice: Subject to any disclaimer, the term of this patent is extended or adjusted under 35 U.S.C. 154(b) by 0 days.

(21) Appl. No.: 09/830,574

(22) PCT Filed: Nov. 12, 1999

(86) PCT No.: PCT/US99/25998

§ 371 (c)(1),
(2), (4) Date: Jul. 2, 2001

(87) PCT Pub. No.: WO00/30021

PCT Pub. Date: May 25, 2000

Related U.S. Application Data

(60) Provisional application No. 60/108,167, filed on Nov. 13, 1998.

(51) Int. Cl.⁷ .................................................. G06K 9/00

(52) U.S. Cl. ...................................... 382/128; 382/159

(58) Field of Search ............................... 382/100, 128, 382/129–134, 108, 157, 156, 181, 286; 324/309; 378/37; 600/407; 606/130

(56) References Cited

U.S. PATENT DOCUMENTS

| | | | |
|---|---|---|---|
| 4,961,425 A | 10/1990 | Kennedy et al. | ............ 600/425 |
| 5,003,979 A | 4/1991 | Merickel et al. | ............ 600/410 |
| 5,133,020 A | 7/1992 | Giger et al. | ................ 382/128 |
| 5,319,549 A | 6/1994 | Katsuragawa et al. | ...... 382/108 |
| 5,410,250 A | 4/1995 | Brown | ........................ 324/304 |
| 5,426,684 A | 6/1995 | Gaborski et al. | ............. 378/62 |
| 5,790,690 A | 8/1998 | Doi et al. | .................... 382/128 |

FOREIGN PATENT DOCUMENTS

| | | |
|---|---|---|
| WO | WO 95/26682 | 10/1995 |
| WO | WO 96/07161 | 3/1996 |

OTHER PUBLICATIONS

Chiou et al., "Application of Neural Network Based Hybrid System for Lung Nodule Detection", Radiology Department, University of Maryland, IEEE 1993, pp. 211–216.*
S. J. Swensen, et al., Medline, 1 page, AN NLM9129544, "The Probability of Malignancy in Solitary Pulmonary Nodules. Application to Small Radiologically Indeterminate Nodules.", Apr. 28, 1997.
M. G. Penedo, et al., 18th Annual International Conference of the IEEE Engineering in Medicine and Biology Society, pp. 1130–1132, "Lung Nodule Detection in Curvature Space with Multilayer Perceptron Network", Oct. 31, 1996.
Gurney J. W.; Swensen S. J. "Solitary pulmonary nodules: determining the likelihood of malignancy wih neural network anaysis", Radiology, Oak Brook, II, U.S. Sep. 1995.
European Patent Office Action.

* cited by examiner

Primary Examiner—Jayanti K. Patel
(74) Attorney, Agent, or Firm—Oblon, Spivak, McClelland, Maier & Neustadt, P.C.

(57) ABSTRACT

A method, computer program product, and system (100) for computerized analysis of the likelihood of malignancy in a pulmonary nodule using artificial neural networks (ANNs) (S4). The method, on which the computer program product and the system is based on, includes obtaining a digital outline of a nodule; generating objective measures corresponding to physical features of the outline of the nodule; applying the generated objective measures to an ANN; and determining a likelihood of malignancy of the nodule based on an output of the ANN. Techniques include novel developments and implementations of artificial neural networks and feature extraction for digital images. Output from the inventive method yields an estimate of the likelihood of malignancy (S7) for a pulmonary nodule.

24 Claims, 24 Drawing Sheets

SYSTEM FOR DETECTION OF MALIGNANCY IN PULMONARY NODULES

This application claims priority under 35 USC 119(e) to U.S. Provisional application Serial No. 60/108,167, filed Nov. 13, 1998.

The present invention was made in part with U.S. Government support under USPHS Grants CA24806 and CA62625. The U.S. Government has certain rights in this invention.

BACKGROUND OF THE INVENTION

1. Field of the Invention

The invention relates generally to a method and system for the computerized analysis of radiographic images, and more specifically, to the determination of the likelihood of malignancy in pulmonary nodules using artificial neural networks (ANNs).

The present invention generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,740,268; 5,790,690; and 5,832,103; as well as U.S. patent applications Ser. No. 08/158,388 (PCT Publication WO 95/14431); Ser. Nos. 08/173,935; 08/220,917 (PCT Publication WO 95/26682); Ser. No. 08/398,307 (PCT Publication WO 96/27846); Ser. No. 08/523,210 (PCT Publication WO 95/15537); Ser. Nos. 08/536,149; 08/562,087; 08/757,611; 08/758,438; 08/900,191; 08/900,361; 08/900,362; 08/900,188; 08/900,189, 08/900,192; 08/979,623; 08/979,639; 08/982,282; 09/027,468; 09/027,685; 09/028,518; 09/053,798; 09/092,004; 09/098,504; 09/121,719; 09/131,162; 09/141,535; 09/156,413; No. 60/107,095 (Attorney Docket No. 0730-0060-20PROV, filed Nov. 5, 1998) all of which are incorporated herein by reference.

The present invention includes the use of various technologies referenced and described in the above-noted U.S. Patents and Applications, as well as described in the references identified in the appended APPENDIX and cross-referenced throughout the specification by reference to the corresponding number, in brackets, of the respective references listed in the APPENDIX, the entire contents of which, including the related patents and applications listed above and the references listed in the APPENDIX, are incorporated herein by reference.

2. Discussion of the Background

Although a solitary pulmonary nodule (SPN) is a common finding on a chest radiograph, the differential diagnosis of a solitary pulmonary nodule or chest radiograph is often a difficult task for radiologists [1–8]. Since a solitary pulmonary nodule may be the first sign of lung cancer, especially in its early stage, most patients undergo a further diagnostic evaluation that may include an imaging study with computed tomography (CT) [1]. Malignant diseases are estimated to occur in about 20% of patients with solitary pulmonary nodules in the population [9]. The majority of radiographically detected pulmonary nodules, however, are benign [3,8,10–14].

Although CT has become a major diagnostic method to differentiate pulmonary nodules in recent years, a large number of CT examinations have been performed for benign cases that were suspected of being malignant. A survey was conducted to obtain estimates for the relative numbers (percentages) of malignant and benign cases that were performed for chest CT study under the investigation of a solitary pulmonary nodule. The survey was performed at the University of Chicago Hospital and at four Hospitals in Japan (University of Occupational and Environmental Health Hospital, Fukuoka; Nagasaki University Hospital, Nagasaki; Iwate Prefectural Central Hospital, Morioka; and Tokyo Metropolitan Hospital, Tokyo). At each institution, patients who underwent chest CT examinations for suspicious pulmonary nodules on chest radiographs were assessed regarding pre-CT clinical diagnosis, the final diagnosis, patient's age, and patient's gender. Final diagnosis was established by a pathologic examination or clinical follow-up.

One hundred thirty-three patients (83 male, 50 female) who ranged in age from 25 to 85 (mean, 62.9 years) were identified at the five hospitals. Pre-CT clinical diagnosis consisted of "suspicion of lung cancer" for 43 of the patients, "lung nodule/lung mass" for 70 of the patients, "abnormal shadow" for 10 of the patients, "suspicion of pulmonary metastasis" for 6 of the patients, and benign diseases for four of the patients ("suspicion of pulmonary tuberculosis" for one patient, "suspicion of pulmonary abscess" for two patients, and "suspicion of pulmonary aspergillosis" for one patient). In the cases in which pre-CT diagnosis included a lung nodule/lung mass, some of the cases may have involved suspected benign diseases; however, it was assumed that most of these cases involved suspected malignancy.

Table 1 shows the summary of the survey on the final diagnosis of solitary pulmonary nodules which underwent chest CT. Fifty-five out of 133 cases (or 41.4%) indicated malignant nodules including primary lung cancer and pulmonary metastases. Sixty-four cases (48.1%) indicated benign conditions including benign diseases and "negative" cases that had no apparent lung abnormality as a result of CT examination. Fourteen cases had inconclusive final diagnoses. The results obtained in this survey show that a large fraction of patients who underwent chest CT examination were ultimately identified as having benign conditions. Accordingly, some of the CT examinations may have been avoided if these benign conditions were diagnosed accurately and/or confidently on the initial chest radiographs.

TABLE 1

| Institution | Malignant | Benign | Benign Lesion | Negative | Unknown | Total |
|---|---|---|---|---|---|---|
| A | 9 (32.0%) | 15 (53.6%) | 11 | 4 | 4 | 28 (100%) |
| B | 8 (25.8%) | 23 (74.2%) | — | — | 0 | 31 (100%) |
| C | 11 (40.7%) | 11 (40.7%) | 3 | 8 | 5 | 27 (100%) |
| D | 6 (35.3%) | 10 (58.8%) | — | — | 1 | 17 (100%) |
| E | 21 (70.0%) | 5 (16.7%) | — | — | 4 | 30 (100%) |
| Total | 55 (41.4%) | 64 (48.1%) | | | 14 | 133 (100%) |

Computer schemes capable of providing objective information on the nature of pulmonary nodules may aid radiologists in their classification of pulmonary nodules. Various computerized schemes have been investigated for characterizing pulmonary nodules.

In most of these studies, however, radiographic features were manually extracted, and the computer was used only to determine the likelihood of malignancy by merging image features using rule-based or discriminant analysis. Swensen et al. [15] estimated the probability of malignancy in radiologically indeterminate SPNs by using multivariate logistic regression. They concluded that three clinical parameters (age, cigarette-smoking status, and history of cancer) and 3 radiological features (diameter, spiculation, and upper lobe location) were independent predictors of malignancy. Cummings et al. [16] estimated the probability of malignancy of pulmonary nodules by using Bayesian analysis based on the diameter of an SPN, the patient's age, history of cigarette smoking, and the prevalence of malignancy in SPNs. Gurney [17,18] also used Bayesian analysis to calculate the probability of malignancy, which was compared with the performance of radiologists.

Other investigators have used computer-extracted features to differentiate between malignant and benign lung nodules. Sherrier et al. [19] applied a gradient analysis for distinguishing benign nodules from malignant nodules, and they presented that benign calcified granuloma showed greater gradient number than malignant nodules. Sasaoka et al. [20] extracted nodule features using a computerized method. However, the extracted features, such as density gradient and density entropy, were not directly correlated with specific radiological findings, and thus the meaning of these features is inconclusive. Recently, artificial neural networks (ANNs) have been used in the field of diagnostic radiology to provide a potentially powerful classification tool [12–27]. Gurney et al. [28] reported that the Bayesian method was better than the neural network in the prediction of the probability of malignancy in pulmonary nodules. Despite these considerable efforts, a computerized scheme has not been applied in clinical situations to assist radiologists in their interpretation of malignancy of pulmonary nodules.

SUMMARY OF THE INVENTION

Accordingly, an object of this invention is to provide a new and improved method and system for the analysis of the likelihood of malignancy in solitary pulmonary nodules using artificial neural networks.

Another object of the present invention is to provide a method and system for implementing a computer-aided diagnostic (CAD) technique to assist radiologists in distinguishing benign and malignant lung nodules.

Another object of this invention is to provide a method and system for assisting radiologists in accurately identifying benign pulmonary nodules.

These and other objects are achieved according to the invention by providing (1) a new and improved method, (2) a storage medium storing a program for performing the steps of the method, and (3) a system for analyzing nodules. The method, on which a computer program product and system is based, includes obtaining a digital outline of a nodule; generating objective measures corresponding to physical features of the outline of the nodule; applying the generated objective measures to an artificial neural network (ANN); and determining a likelihood of malignancy of the nodule based on an output of the ANN.

Techniques include the use of ANNs to merge subjective features extracted by radiologists to determine the likelihood of malignancy of solitary pulmonary nodules. Additional techniques include computerized extraction of objective measures of lung nodules that are correlated to the subjective features seen by radiologists, and the use of ANNs to estimate the likelihood of malignancy by merging the objective measures. The performance of the ANNs is evaluated by means of receiver operating characteristic (ROC) analysis. The performance of radiologists is evaluated in classifying benign and malignant nodules for comparison with the computerized methods.

The present invention thus addresses the problems associated with the conventional diagnosis of pulmonary nodules. The method and system of the invention, using ANNs to merge subjective data obtained manually or objective data obtained with automated techniques, is thus able to estimate the likelihood of malignancy. This estimate assists radiologists in confidently and accurately identifying benign nodules, thereby helping to reduce the number of unnecessary CT examinations (i.e., CT examinations performed on patients with benign nodules).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1($b$) is an image of a score sheet 10 to be used by radiologists to subjectively characterize lung nodules;

FIG. 2($c$) is an image of a hand-drawn outline delineating the malignant nodule of FIG. 2($a$);

FIG. 2($d$) is an image of a hand-drawn outline delineating the benign nodule of FIG. 2($b$);

FIG. 2($e$) is an image of an ellipse calculated to fit the outline of the malignant nodule delineated (extracted) in FIG. 2($c$);

FIG. 2($f$) is an image of an ellipse calculated to fit the outline of the benign nodule delineated (extracted) in FIG. 2($d$);

FIG. 3($b$) is a one-dimensional representation of the nodule outline of FIG. 2($d$) as the distance from sample points distributed with equal intervals on the calculated ellipse of FIG. 2($f$);

FIGS. 4($b$), 4($c$), and 4($d$) are respective graphs, for attending radiologists (4($b$)), radiology residents (4($c$)), and all radiologists (4($d$)), of receiver operating characteristic ROC) curves showing how accurately benign and malignant nodules were identified using an ANN trained with selected subjective features and an ANN trained with all subjective features quantified by the respective radiologists.

DETAILED DESCRIPTION OF THE PREFERRED EMBODIMENTS

Figure 1A:
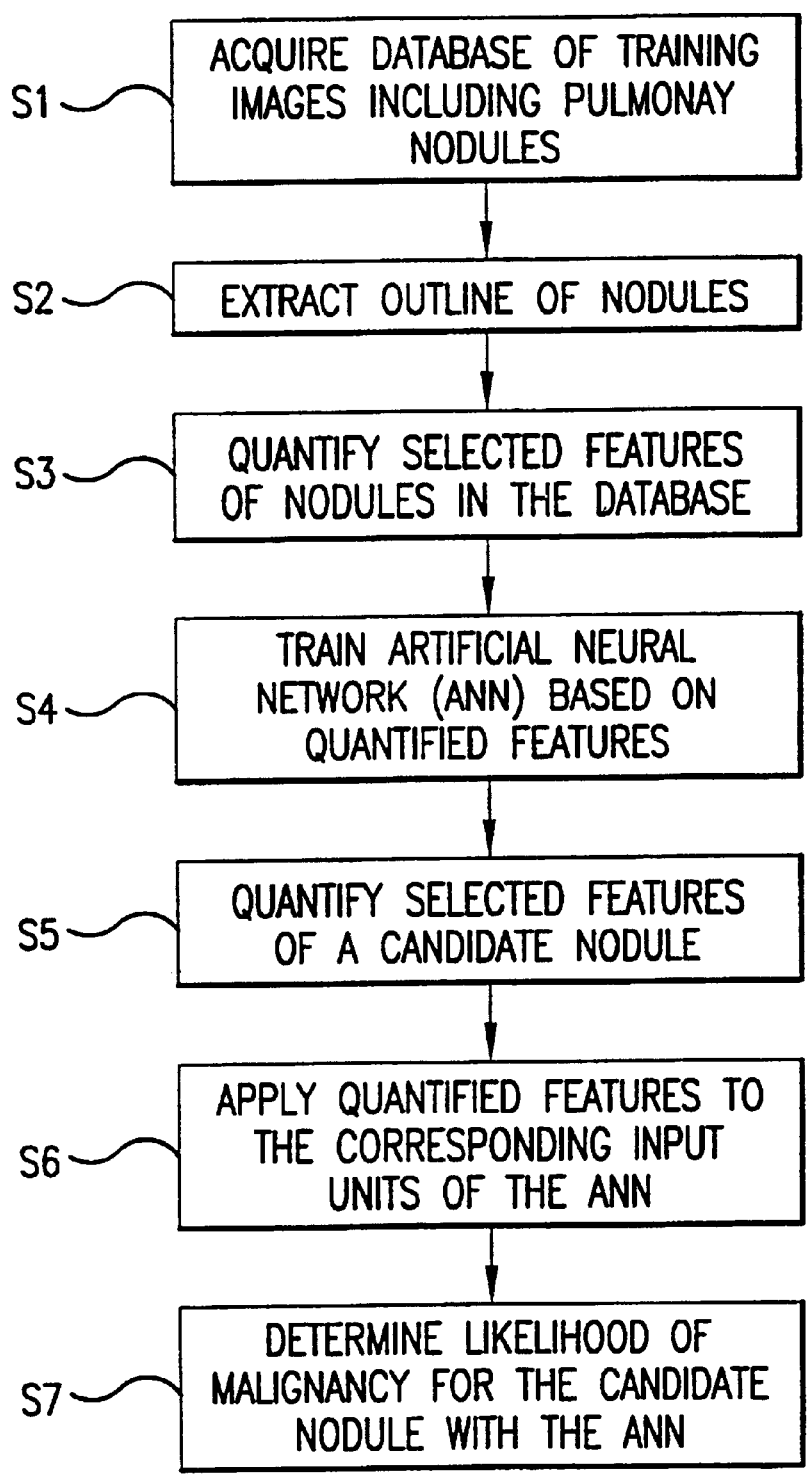
FIG. 1($a$) is a flowchart of the method used to analyze the likelihood of malignancy in pulmonary nodules according to the present invention.

Referring now to the drawings, and more particularly to FIG. 1(a) thereof, there is shown a schematic diagram of a method for the computerized analysis of the likelihood of malignancy in pulmonary nodules using a set of selected features. The overall technique includes an initial acquisition of a database of digital medical images (training images) in step S1. The digital medical images include images of pulmonary nodules. Then, in step S2 the approximate outlines (i.e., approximate contours) of the nodules are extracted (i.e., delineated) manually by a radiologist. Next, in step S3 selected features of the nodules shown in the digital medical images are quantified. The selected features may include clinical parameters, subjective features, and/or objective measures. The quantification of the selected features may be performed subjectively, by humans, and/or objectively, using automated techniques described below. If none of the selected features are determined based on the extracted outline of the nodule, then step S2 may be skipped. In step S4 an artificial neural network (ANN) is trained based on the selected features quantified in step S3.

Once the ANN is trained in steps S1 through S4, the likelihood of malignancy for a candidate pulmonary nodule (i.e., a pulmonary nodule to be analyzed) may be determined in steps S5 through S7. In step S5 the selected features are quantified for the candidate nodule. Then, in step S6 the quantified features are input to the respective input nodes of an ANN. In step S7, an output unit of the ANN determines the likelihood of malignancy of the candidate nodule based on the quantified features input in step S6. Each step of FIG. 1(a) is discussed in greater detail below.

Database

In order to provide comparative test results, a database was constructed from 56 chest radiographs selected from the cases that were used for development of computerized schemes for detection of lung nodules [29, 30]. Solitary pulmonary nodules larger than 3 cm were excluded in this study. None of the nodules showed calcification using CT, nor were scar-like linear opacities visible. The final diagnosis was established pathologically, and for some benign nodules, a presumed diagnosis of benign etiology was made because of no change or decrease in nodule size over a 2 year period. The 56 chest radiographs included 34 malignant nodules, all of which were pathologically proven primary bronchogenic carcinoma. The radiographs further included 22 benign lesions, 2 of which were classified as pulmonary hamartoma, 12 of which were classified as granuloma, 7 of which were classified as inflammatory lesion, and 1 which was classified as pulmonary infarction. The 56 chest radiographs were obtained in 33 women and 23 men who ranged in age from 24 to 86 years (mean, 58.4 years). Chest radiographs were digitized with a laser scanner (model number 2905 manufactured by Abe Sekkei of Tokyo, Japan) with a pixel size of 0.175 mm and a 10-bit gray scale (1,024 gray levels). In an alternative embodiment, however, a database of more or fewer radiographs is used.

Subjective Feature Extraction by Radiologists

Figure 1B:

Radiological findings on pulmonary nodules provided eight subjective features, including nodule size, nodule shape, marginal irregularity, spiculation, border definition, lobulation, nodule density (contrast), and homogeneity. These features are described by way of example in FIG. 1(b) which shows a score sheet 10 to be used in subjectively characterizing the lung nodules.

The nodules' sizes were measured by using a ruler. The variations in measured nodule sizes between different observers was mainly due to the variation in subjective judgments on nodule edges.

Seven radiologists (4 attending radiologists ("attendings") and 3 radiology residents ("residents")) characterized the features of each nodule independently using a score sheet, such as the score sheet 10, with scales from 1 to 5. Nodule shape was scored from round to elongated; marginal irregularity was scored from smooth to irregular; spiculation was scored from non-spiculated to spiculated; border definition was scored from well-defined to ill-defined; lobulation was scored from non-lobulated to lobulated; nodule density (contrast) was scored from low density to high density; homogeneity was scored from homogeneous to inhomogeneous. The score sheet included images of two extreme examples (i.e., an example of a "1" and a "5") for each feature. The diagrams served as a scoring guide for the radiologists; for example, an image of a non-spiculated nodule (i.e., a "1") and a spiculated nodule (i.e., a "5") were provided to help assess the degree of spiculation.

Figure 2A:
FIGS. 2($a$) and 2($b$) are respective images of (a) a malignant nodule and (b) a benign nodule.
Figure 2B:

Table 2 shows examples of a radiologist's subjective ratings for the eight subjective radiological features for the malignant and benign pulmonary nodules shown in FIGS. 2(a) and 2(b), respectively. To eliminate the bias of the knowledge of "truth," all radiologists rated each nodule without knowledge of the correct diagnosis.

TABLE 2

| Image Features | Malignant | Benign |
|---|---|---|
| Nodule size (mm) | 25 | 21 |
| Nodule shape (1=round, 5=elongated) | 4 | 5 |
| Marginal irregularity (1=smooth, 5, irregular) | 5 | 1 |
| Spiculation (1=non-spiculated, 5-spiculated) | 5 | 1 |
| Border definition (1=well-defined, 5=ill-defined) | 4 | 2 |
| Lobulation (1-non-lobulated, 5=lobulated) | 5 | 2 |
| Nodule density (contrast) (1=low, 5=high) | 5 | 4 |
| Homogeneity (1=homogeneous, 5=inhomogeneous) | 5 | 1 |

Objective Feature Extraction by Computer

The following twelve features were selected for computer characterization of pulmonary nodules that were extracted from digitized chest radiographs: effective diameter; degree of circularity; degree of ellipticity; root mean square (RMS) variation; first moment of power spectrum; degree of irregularity; average gradient; radial gradient index (RGI); tangential gradient index (TGI); line enhancement index (LEI); average pixel value; and standard deviation of pixel values. These twelve features were objective physical measures selected on the basis of their expected correlations with the subjective features that were used in radiologists' ratings.

Figure 2C:
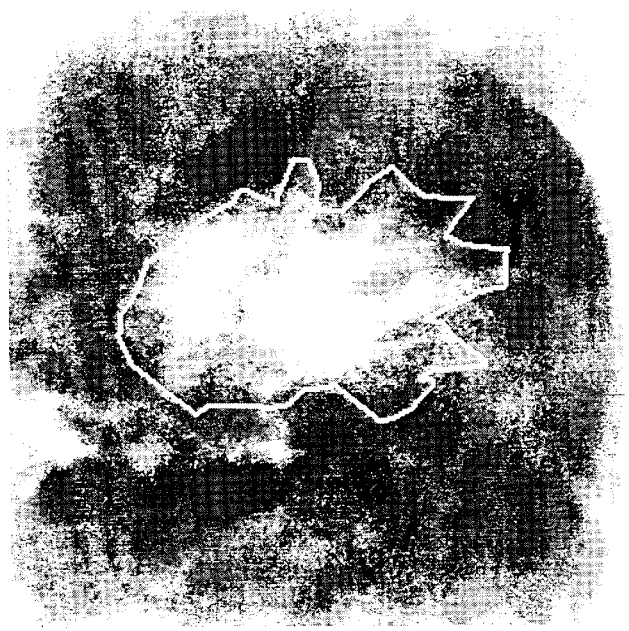
Figure 2D:

The objective measures are quantified or determined based on the outline (or contour) of the nodules manually extracted by a first radiologist. FIG. 2(c) shows the hand-drawn outlines (i.e., margins) for the malignant nodule of FIG. 2(a). FIG. 2(d) shows the hand-drawn outlines for the benign nodule of FIG. 2(b). A second radiologist independently extracted a second set of nodule outlines to examine the variation in these objective measures derived from the outlines. The radiologists were not informed about correct diagnosis in order to avoid a bias to the outlines.

The effective diameter provides an objective measure of the nodule size. The effective diameter [31, 32] is the diameter of an equivalent circle having the same area as that defined by the outline of the nodule.

The degree of circularity provides an objective measure of the nodule shape. The degree of circularity is the ratio of the area of the nodule overlapped with the equivalent circle, to the total area of the nodule [31, 32].

Figure 2E:
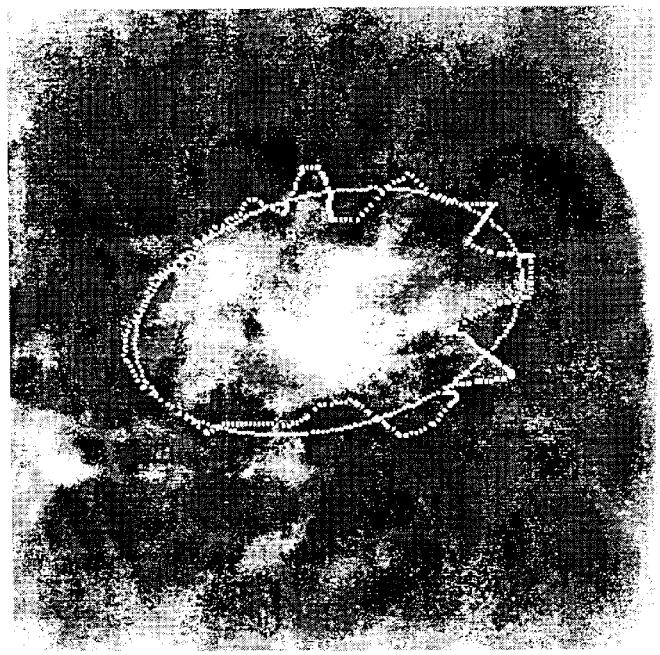
Figure 2F:

The degree of ellipticity also provides an objective measure of the nodule shape. The degree of ellipticity is determined in the same manner as that for the degree of circularity, except that an ellipse approximating the nodule outline is calculated using a least squares fit [33, 34]. FIG. 2(e) shows an ellipse calculated to fit to the outline of the malignant nodule of FIG. 2(a). FIG. 2(f) shows an ellipse calculated to fit to the outline of the benign nodule of FIG. 2(b).

Figure 3A:
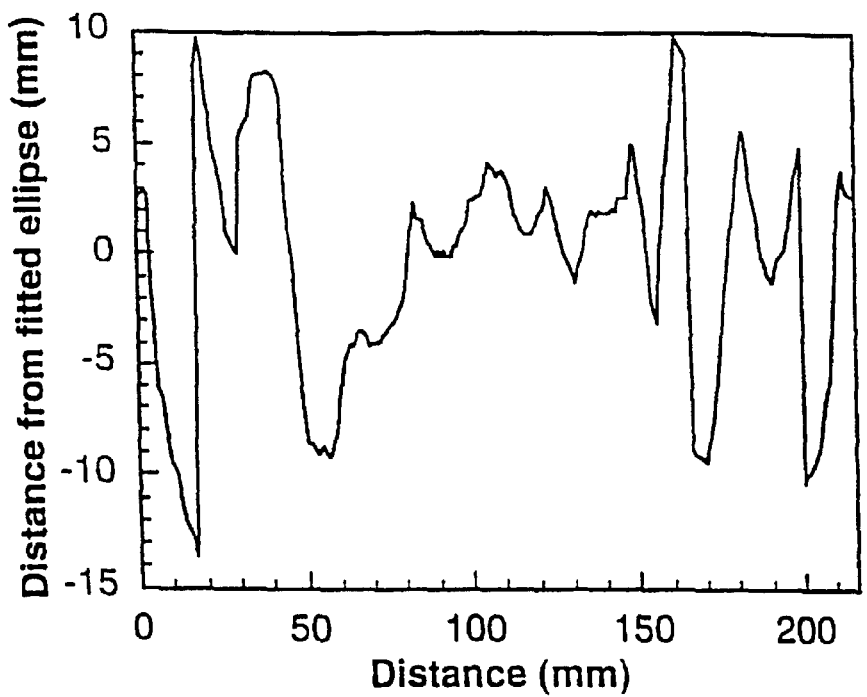
FIG. 3($a$) is a one-dimensional representation of the nodule outline of FIG. 2($c$) as the distance from sample points distributed with equal intervals on the calculated ellipse of FIG. 2($e$)
Figure 3B:
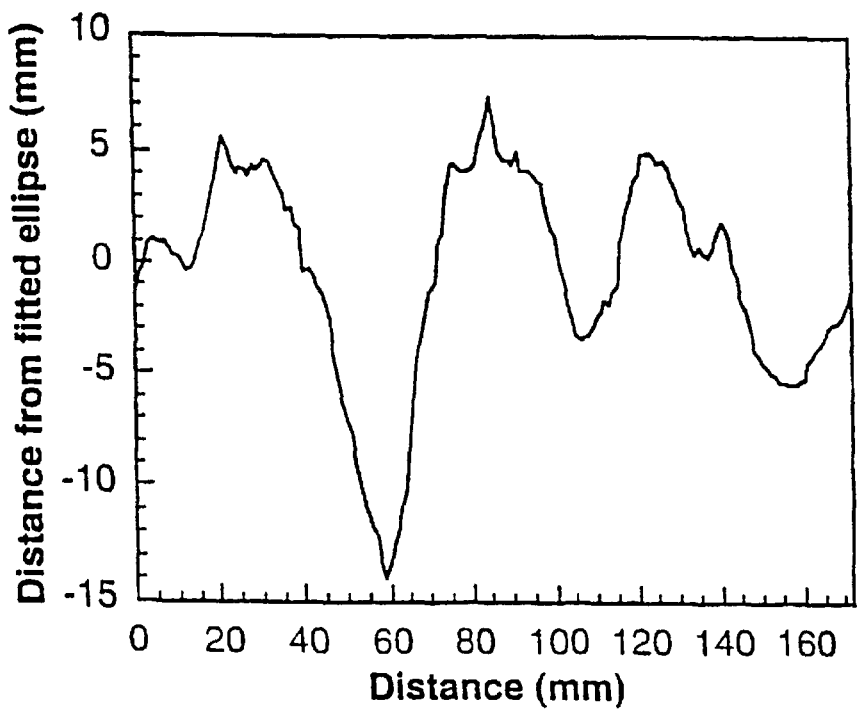

The definition of marginal irregularity includes two independent factors: the magnitude and the coarseness (or fineness) of irregular edge patterns. The edge pattern is the distance from the nodule outline to the calculated ellipse, as illustrated in FIGS. 3(a) and 3(b) for the malignant and benign nodules of FIGS. 2(a) and (b), respectively. The irregular edge pattern was analyzed using Fourier transformation. The RMS variation and the first moment of power spectrum [35] were each determined to provide separate measures of marginal irregularity.

The degree of irregularity [32] provides another measure of marginal irregularity. The degree of irregularity is one minus the ratio of (a) the perimeter (i.e., circumference) of the ellipse used to determine degree of ellipticity to (b) the length of the extracted outline.

Border definition is quantified by the average gradient, which is obtained by the average edge gradients over a selected border region. The border region is the area between an outer limit defined by the fitted ellipse plus twice the RMS variation and an inner limit defined by the fitted ellipse minus twice the RMS variation. Thus, the border region has a width of four times the RMS variation as measured from the center of the calculated ellipse.

RGI provides an objective measure of the spiculation of a nodule. The RGI is the average absolute value of the radial edge gradients projected in a direction along the radial direction [42]. The radial direction is a line from the center of mass of the calculated ellipse. For each pixel in the border region, the absolute value of the radial edge gradient projected in a direction along the radial direction is determined.

The resulting absolute values are summed and averaged to determine the RGI according to the following formula:

$$RGI = \frac{\sum_{P \in L} |\cos\phi \sqrt{D_x^2 + D_y^2}|}{\sum_{P \in L} \sqrt{D_x^2 + D_y^2}}$$

where P is the pixel or image point, L is the set of pixels in the border region, $D_x$ is the gradient in the x-direction, $D_y$ is the gradient in the y-direction, and $\phi$ is the angle between the gradient vector and the radial direction.

TGI provides another measure of the spiculation of a nodule. The TGI is obtained from a tangential component of the edge gradient at a pixel, which is projected in a direction perpendicular to the radial direction. Accordingly, the following formula is used to determine TGI:

$$TGI = \frac{\sum_{P \in L} |\sin\phi \sqrt{D_x^2 + D_y^2}|}{\sum_{P \in L} \sqrt{D_x^2 + D_y^2}}$$

LEI provides yet another measure of spiculation and indicates the magnitude of line pattern components obtained by means of a line enhancement filter [36], in a direction within 45 degrees from the radial direction. Thus, LEI indicates the number of pixels in the border region that form part of a line pattern having a direction within 45 degrees of the radial direction, divided by the total number of pixels in the border region. Whether a pixel forms part of a line pattern (i.e., whether a pixel is a line pattern component) is determined by the line enhancement filter [36].

The average pixel value provides a measure of the optical density of a nodule. The average pixel value is the average pixel value (i.e., gray level) over the nodule as defined by the extracted outline.

The standard deviation of pixel values over the nodule provides a measure of the homogeneity of the nodule. The standard deviation is the standard deviation of pixel values over the nodule as defined by the extracted outline.

Artificial Neural Network

Figure 4A:
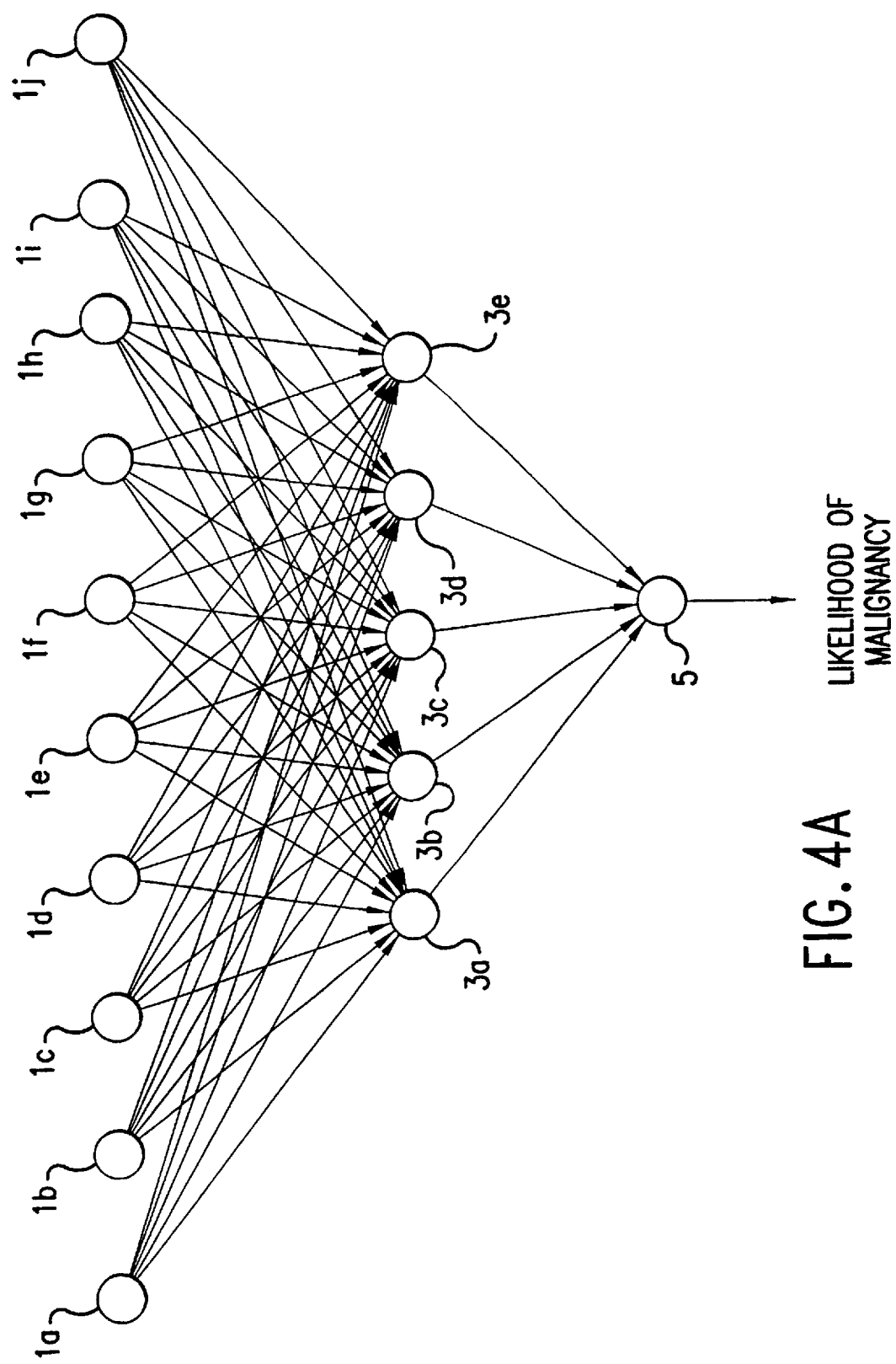
FIG. 4($a$) is an illustration of an artificial neural network (ANN) for determining the likelihood of malignancy in a pulmonary nodule in accordance with the present invention.
Figure 4B:
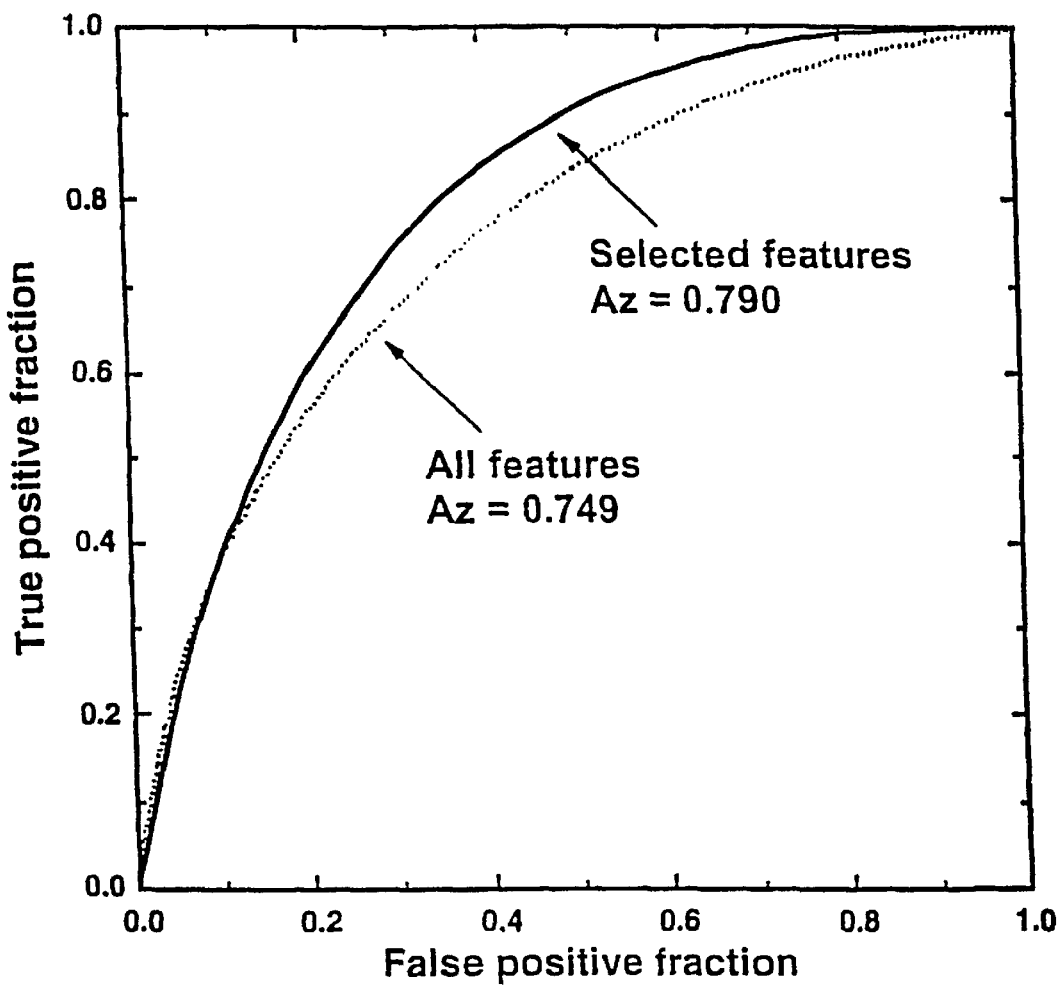
Figure 4C:
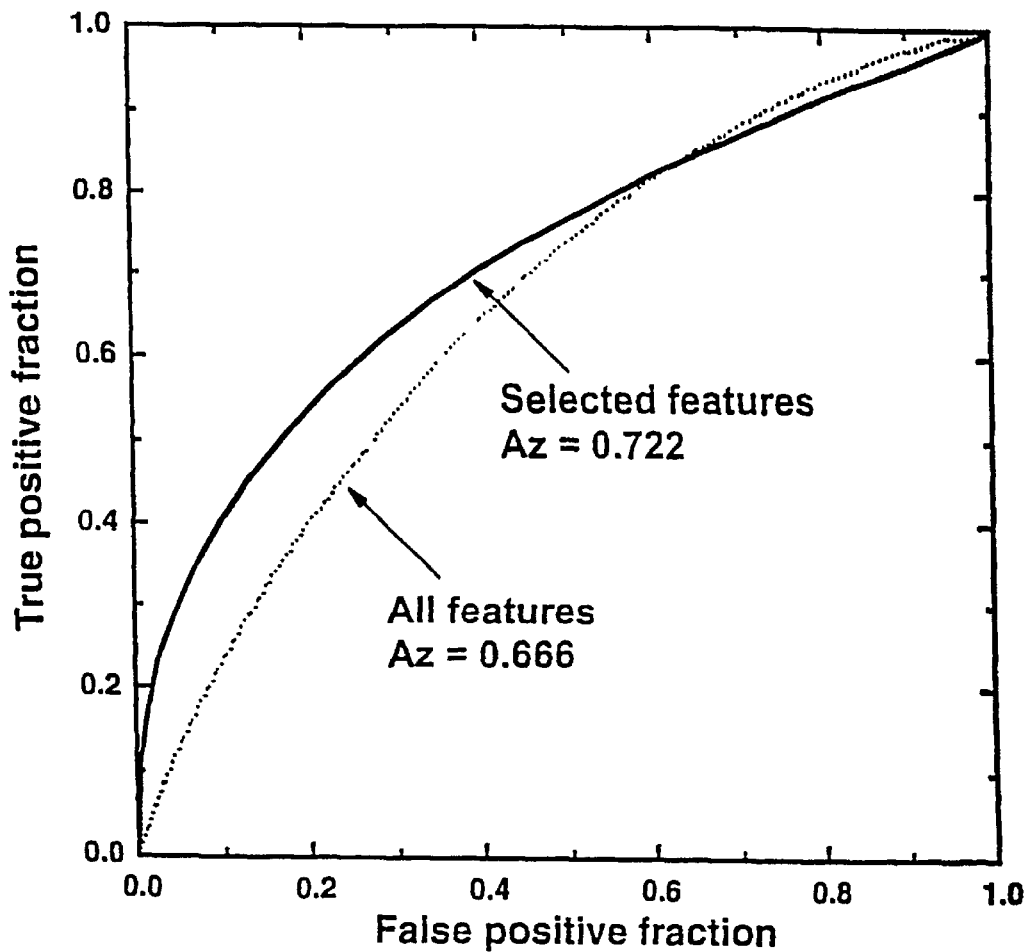
Figure 4D:
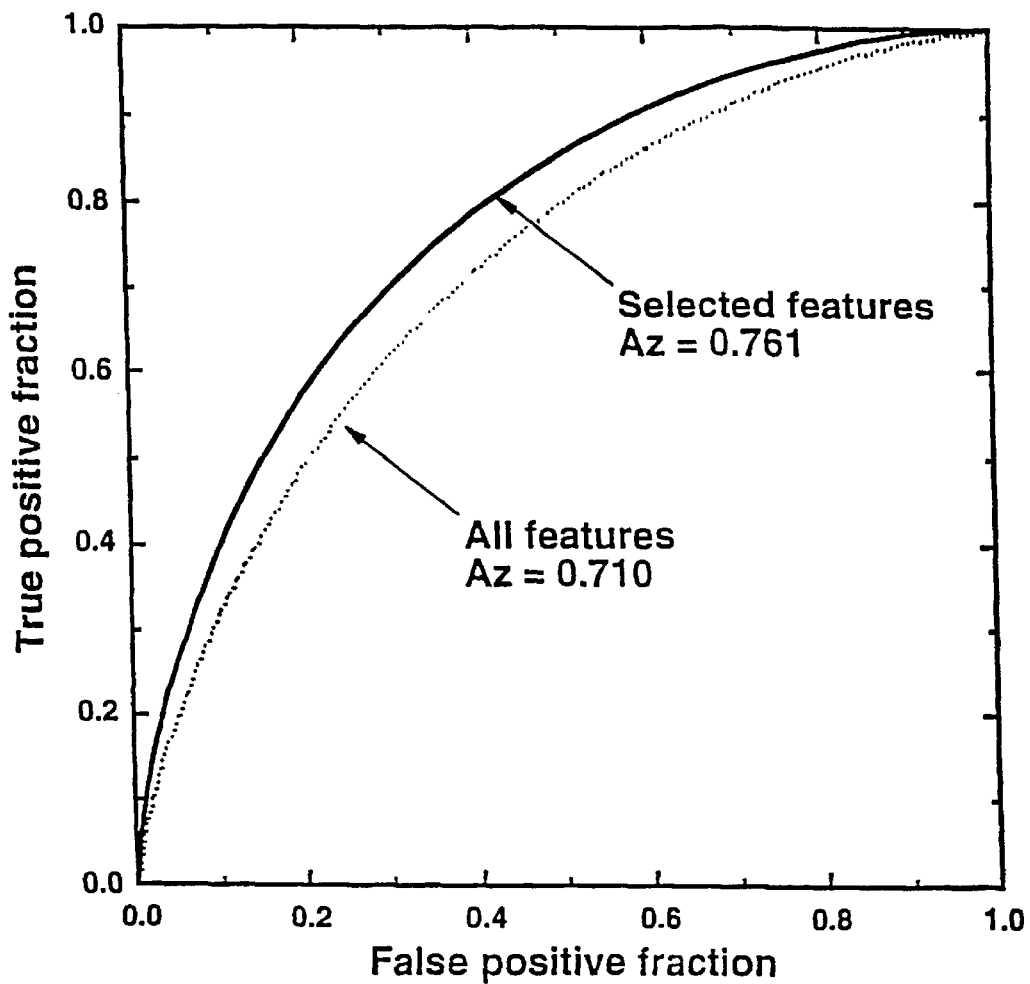

FIG. 4(a) is a diagram of a three-layer, feed-forward artificial neural network (ANN) trained with a back propagation algorithm [37] and used to determine the likelihood of malignancy for a pulmonary nodule. In an alternate embodiment, another learning algorithm is used instead of back propagation. The features input (applied) to the ANN included two clinical parameters (patient's age and gender) and either the eight subjective radiological features quantified by radiologists or selected of the physical measures (objective features) quantified using computer analysis. The same features are used to test and train each ANN. The number of input units equals the number of features input to the ANN. The number of hidden units may also vary but is preferably half the number of input units. For example, when 10 features were input, the basic structure of the neural network included 10 input units 1a, 1b, 1c, 1d, 1e, 1f, 1g, 1h, 1i, 1j; 5 hidden units 3a, 3b, 3c, 3d, 3e; and an output unit 5. The input data obtained from clinical parameters, subjective ratings by radiologists, and physical measures obtained by using a computer were normalized in the range of 0 to 1. The output of the neural network represented the likelihood of malignancy which ranged from 0 to 1 (0=benign, and 1=malignant).

The training and testing of the neural network was performed using a round-robin (or leave-one-out) method [24].

With this method, all but one case in the database is used for training, and the case not used for training is applied for testing the trained ANNS. This procedure was repeated until every case in the database is used once for testing. The performance of the ANN was evaluated on a per patient basis [24]. The performance of the ANNs was evaluated by means of receiver operating characteristic (ROC) curves [38]. The LABROC4 program [39] was used to fit ROC curves, and the area under the ROC curve (Az) was used as an index of the performance in distinguishing between benign and malignant nodules. If the output unit of the ANN outputs a likelihood greater than a preselected threshold value, then the nodule being analyzed is considered to be malignant. Although the threshold may be set at 0.5, the threshold is preferably set at 0.1 or 0.05 so that malignant nodules are correctly identified. Thus, low thresholds increase the sensitivity of the ANN with regard to classifying malignant nodules, at the risk of increased false positives. However it is preferable to ensure that malignancies are identified since the risk of missing a malignancy is worse than the risk of exposure to an unnecessary CT. ps Observer Study To evaluate the performance of radiologists in classifying pulmonary nodules, seven radiologists (4 attendings and 3 residents) participated in the observer study. Each observer (i.e., participating radiologist) was presented with a chest radiograph and two clinical parameters (patient's age and gender). Each observer was then asked to provide his or her confidence level regarding the likelihood of malignancy by using a continuous rating scale with a line checking method [29]. Confidence ratings of "definitely benign" and "definitely malignant" were marked above the left and the right end, respectively, of the line. Radiographs were presented in random order. ROC analysis was employed for comparison of the performance of observers with those of the computerized methods in distinguishing between benign and malignant nodules.

Performance of ANNs Trained with the Subjective Ratings of Radiologists

A round-robin method was employed for the data set extracted (quantified) by each radiologist separately in determining the ANN performance. Table 3 shows the performance index, Az, when distinguishing between benign and malignant nodules, of the ANN trained with image features extracted by each radiologist separately, and by all radiologists combined. There is a relatively large variation among Az values ranging from 0.579 to 0.834, which indicates a considerable variation among the scoring of image features by radiologists. It is also noted that the performance of the ANN with features extracted by radiology residents were much lower than that of attending radiologists. The selected features were patient age, nodule size, marginal irregularity, border definition, nodule density (contrast), and homogeneity.

TABLE 3

| Radiologists | All Subjective Features | Selected Subjective Features |
| --- | --- | --- |
| Attendings | | |
| A | 0.792 | 0.839 |
| B | 0.763 | 0.816 |
| C | 0.579 | 0.657 |
| D | 0.834 | 0.848 |
| average | 0.742 | 0.790 |

TABLE 3-continued

| Radiologists | All Subjective Features | Selected Subjective Features |
| --- | --- | --- |
| Residents | | |
| E | 0.616 | 0.691 |
| F | 0.683 | 0.726 |
| G | 0.700 | 0.722 |
| average | 0.666 | 0.722 |
| Average | 0.710 | 0.761 |
| All radiologists | 0.747 | 0.754 |

It is generally desirable for ANNs to achieve a high performance even when only a small number of essential input units are applied. Thus, an attempt was made to reduce the number of input units, because the initial selection of subjective features may include redundant and nondiscriminating features, which can degrade the ANN performance in distinguishing benign from malignant pulmonary nodules. On the basis of the performance obtainable by using each feature independently as well as radiologists' knowledge and experience, 6 features including patient's age, the nodule size, marginal irregularity, spiculation, border definition, and homogeneity were selected. The average Az value of 0.761 for all 7 radiologists with 6 selected subjective features was statistically significantly greater than that (0.710) with all 10 subjective features (p<0.0007).

FIGS. 4(a), 4(b), 4(c), and 4(d) show ROC curves obtained by the ANN trained with 10 features (2 clinical parameters (age and gender) and all 8 subjective features) and an ANN trained with 6 features (1 clinical feature (age) and five subjective features (nodule size, marginal irregularity, spiculation, border definition, and homogeneity)) as input data. The average Az value for the ANN with 6 features was greater than those with 10 features.

Figure 5A:
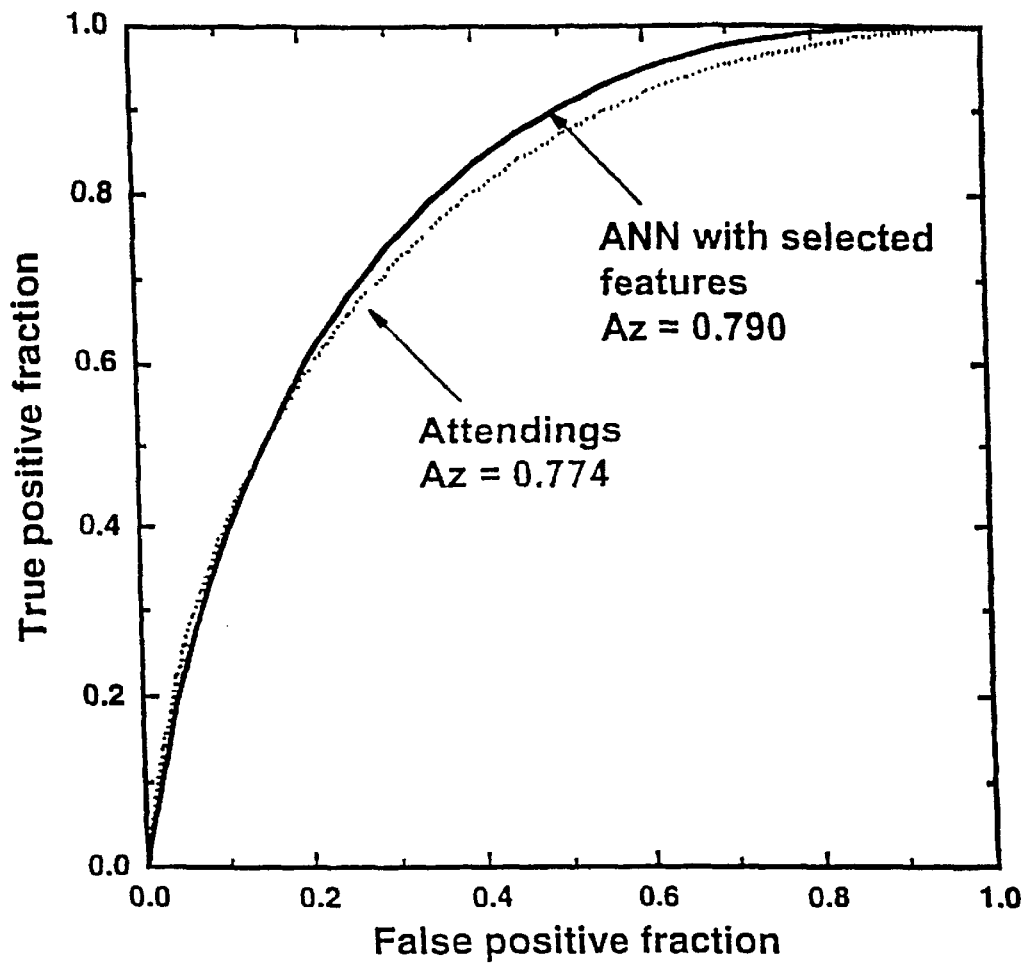
FIGS. 5($a$), 5($b$), and 5($c$) are respective graphs comparing ROC curves of (a) attending radiologists versus an ANN trained using selected subjective features quantified by the attending radiologists, (b) radiology residents versus an ANN trained using selected subjective features quantified by the radiology residents, and (c) the average performance of all radiologists versus an ANN trained using selected subjective features quantified by all radiologists, in distinguishing between benign and malignant nodules.
Figure 5B:
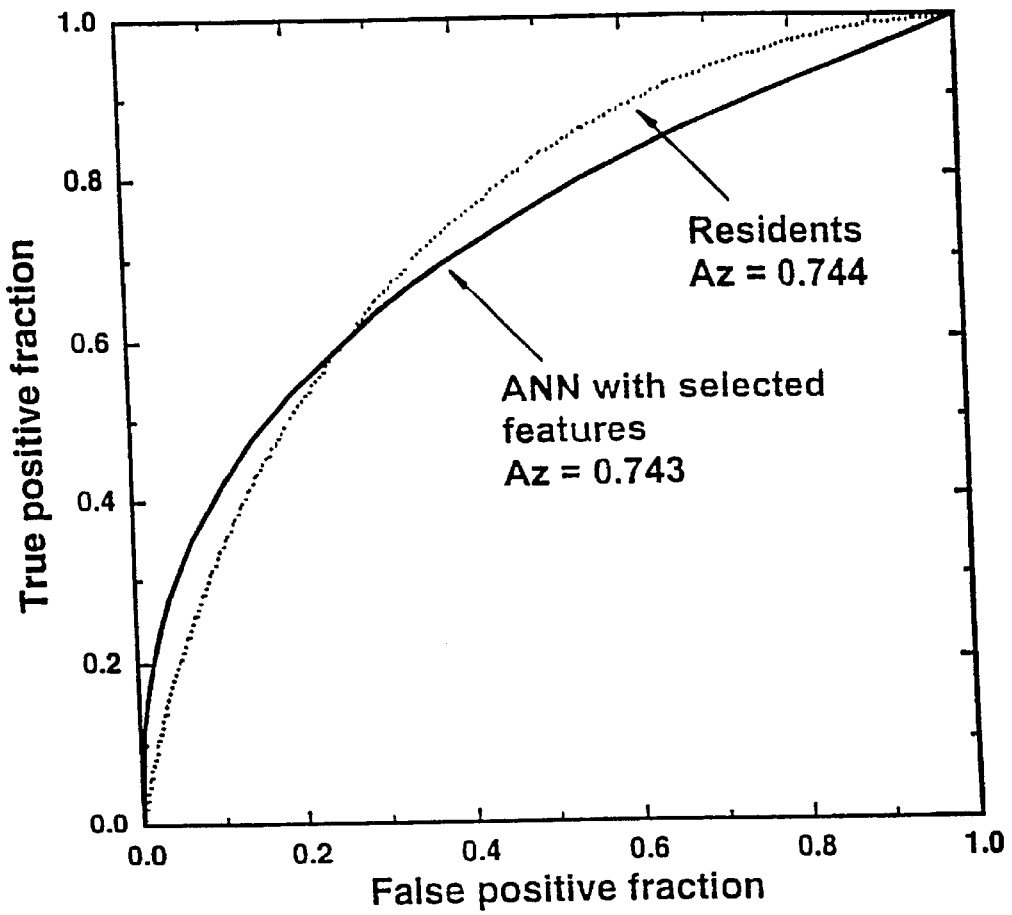
Figure 5C:
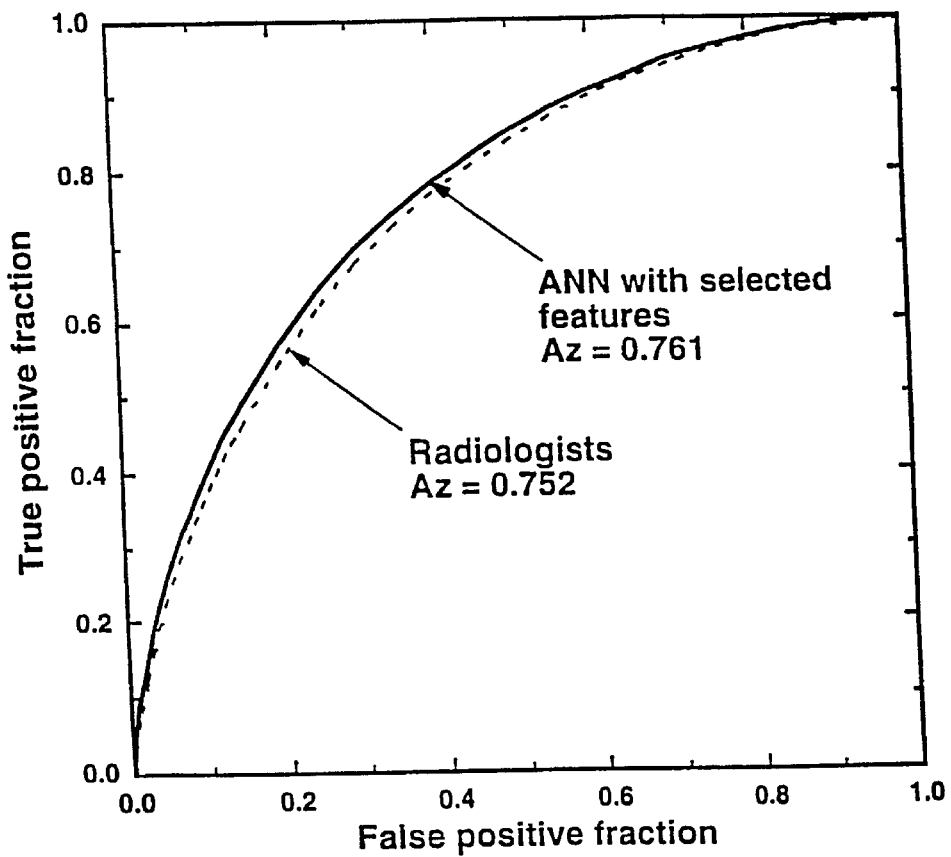

FIGS. 5(a), 5(b), and 5(c) compare the performances of the radiologists in differentiating pulmonary nodules with the ANN trained with six selected subjective features (1 clinical feature (age) and five subjective features (nodule size, marginal irregularity, spiculation, border definition, and homogeneity)). The average performance of the ANN when trained with the six subjective features obtained from attendings was slightly greater than the average performance of the attendings. The average performance of the ANN when trained with the six subjective features obtained from residents was comparable to the average performance of the residents.

Another subset of features, including patient's age and five subjective features (nodule size, marginal irregularity, border definition, nodule density (contrast), and homogeneity), was selected. The ANN trained with this set of features performed better (based on Az) than the ANN with all 10 features. These results indicate that the ANN appeared to be able to learn and generalize better when trained with only a selected subset of features (patient's age, nodule size, marginal irregularity, border definition, nodule density (contrast), and homogeneity) than when trained with all 10 features.

The performance of the ANN trained with the features obtained from all radiologists (i.e., attendings and residents) together was also evaluated. The performance of the ANN with the features extracted by all radiologists is also shown in Table 3. The Az value for the ANN trained and tested with the subjective features obtained from all radiologists was comparable to the average Az value for ANNs trained with the features obtained by each attending radiologist when the ANN used gender, age, and all 8 subjective features.

However, when the ANN used age and five selected subjective features, the Az value for the ANN trained with features obtained from all radiologists was lower than the average Az value for ANNs trained with features obtained from each attending radiologist. This appears to indicate that, despite the larger amount of input data for the ANN trained with features determined by all radiologists, the ANN did not learn the patterns of input data well when distinguishing between benign and malignant nodules. This may be due to the variation among radiologists' subjective ratings.

Computerized Analysis of Nodule Features

Figure 6A:
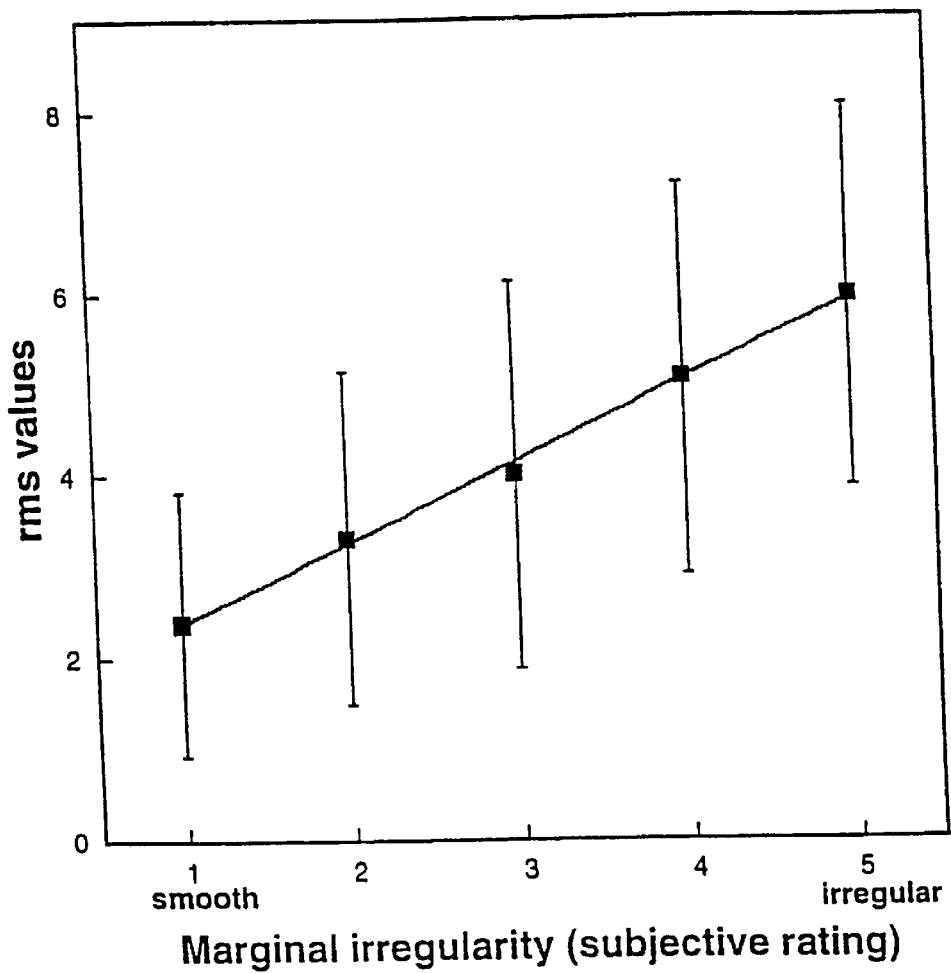
FIGS. 6(a) and 6(b) are graphs showing the respective relationships between (a) the root mean square (RMS) value and subjective rating of marginal irregularity, and (b) the standard deviation of pixel values and subjective rating of homogeneity.
Figure 6B:
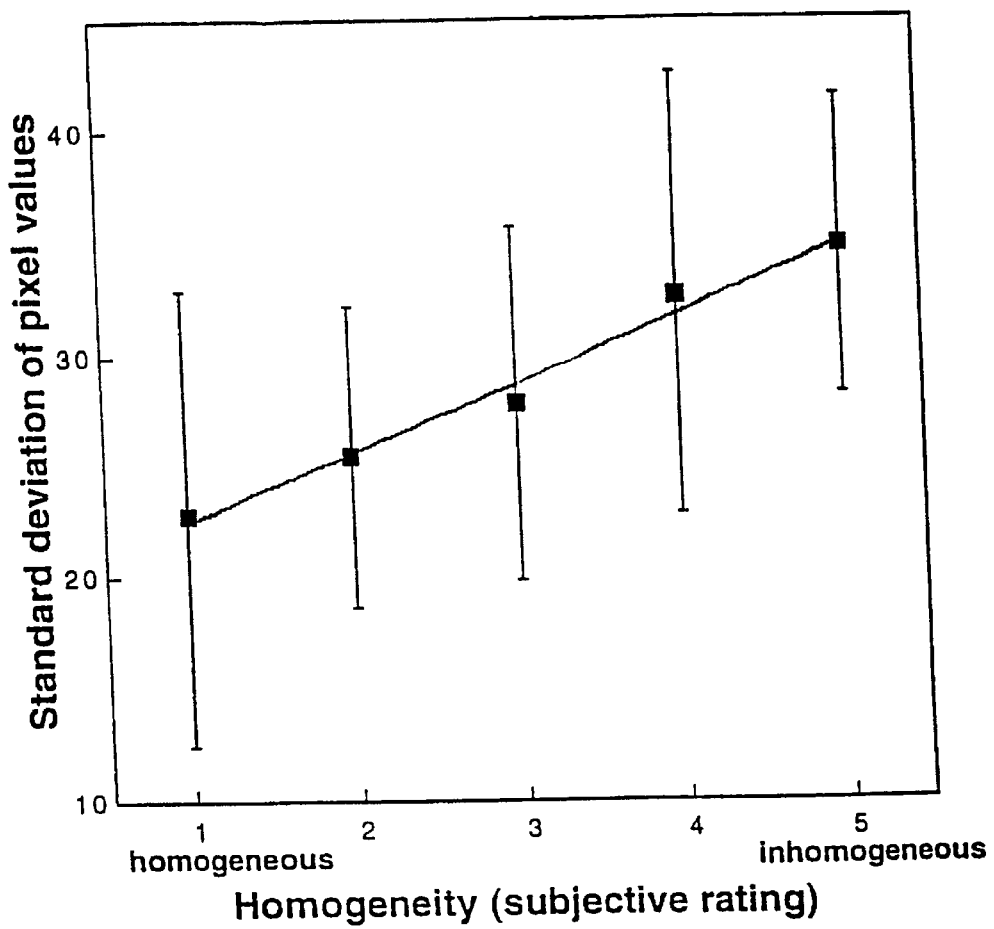

Different objective, physical measures obtained with computerized analysis were first compared with radiologists' subjective ratings (i.e., scores) to determine the utility of those measures. FIGS. 6(a) and 6(b) respectively show (a) the relationships between the RMS value and subjective ratings of marginal irregularity, and (b) the relationships between the standard deviation of pixel values and subjective ratings of homogeneity. The small squares and vertical bars in FIGS. 6(a) and 6(b) indicate the average and the standard deviation, respectively, of each physical measure obtained from all nodules included in each of five different subjective ratings. These results indicate that physical measures are correlated well with the radiologists' subjective ratings. Table 4 shows the correlation coefficients between the objective measures and the subjective features. As seen from Table 4, most objective measures are generally well correlated with the corresponding subjective features.

TABLE 4

| Subjective Features | Physical Measures | Correlation Coefficient |
|---|---|---|
| (1) Nodule Shape | Degree of Circularity | −0.885 |
|  | Degree of Ellipticity | −0.931 |
| (2) Marginal Irregularity | Degree of Irregularity | 0.939 |
|  | RMS variation | 0.999 |
|  | First moment of power spectrum | −0.177 |
| (3) Spiculation | Tangential Gradient Index (TGI) | 0.934 |
|  | Radial Gradient Index (RGI) | −0.880 |
|  | Line Enhancement Index (LEI) | 0.986 |
| (4) Border definition | Average Gradient | 0.946 |
| (5) Nodule Density | Average Pixel Value | 0.988 |
| (6) Homogeneity | Standard deviation of pixel value | 0.992 |

Figure 7A:
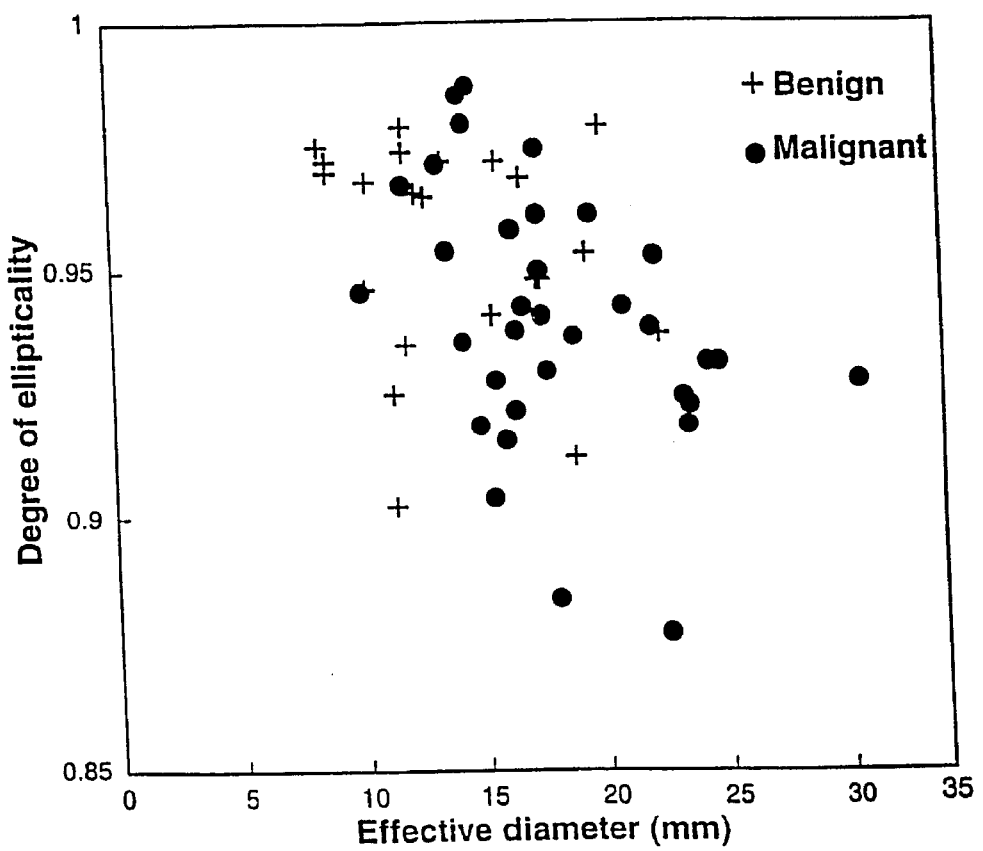
FIGS. 7(a), 7(b), 7(c), and 7(d) are graphs showing the respective relationships between (a) effective diameter and degree of ellipticity, (b) standard deviation of pixel values and average pixel value, (c) degree of circularity and RMS variation, (d) average edge gradient and degree of elliptical irregularity, for malignant and benign nodules.
Figure 7B:
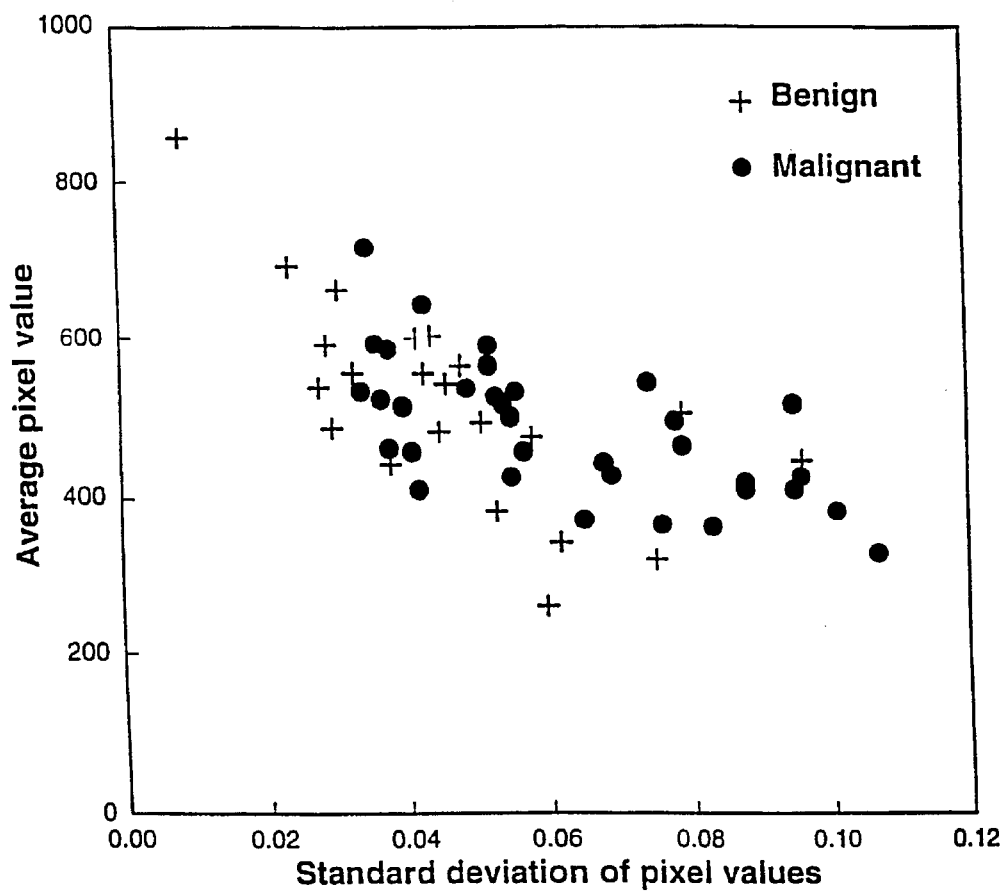
Figure 7C:
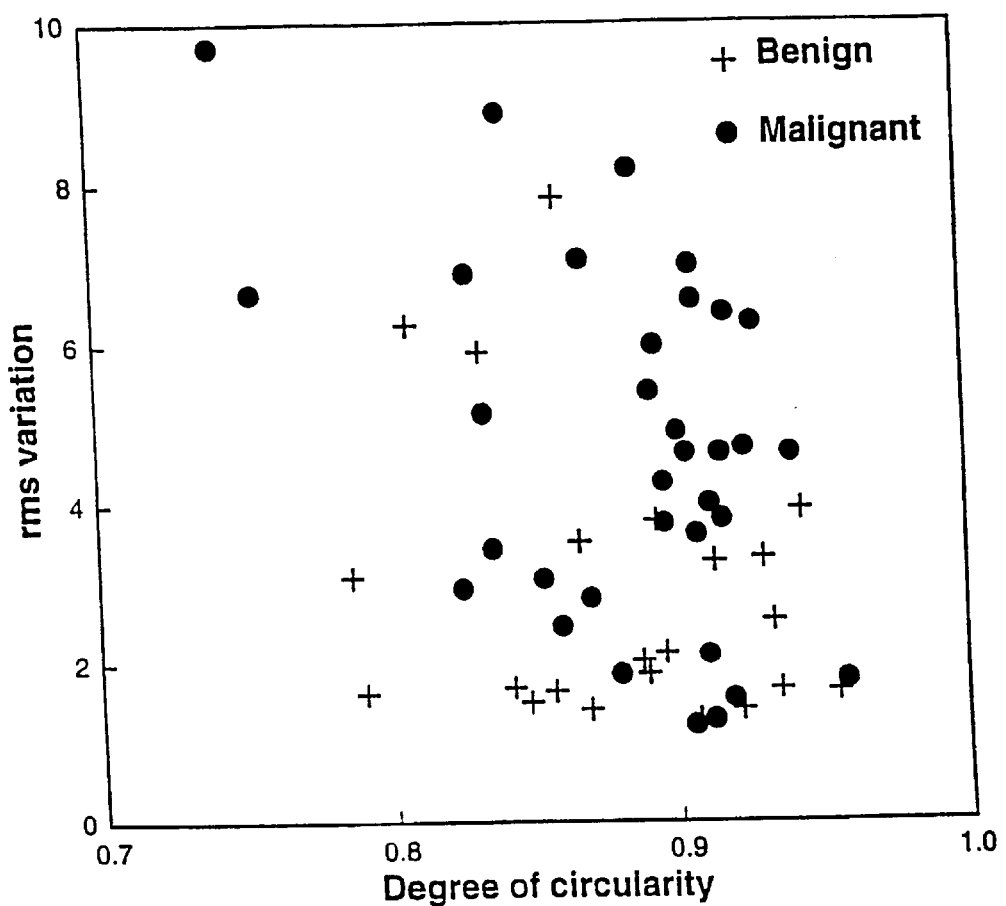
Figure 7D:
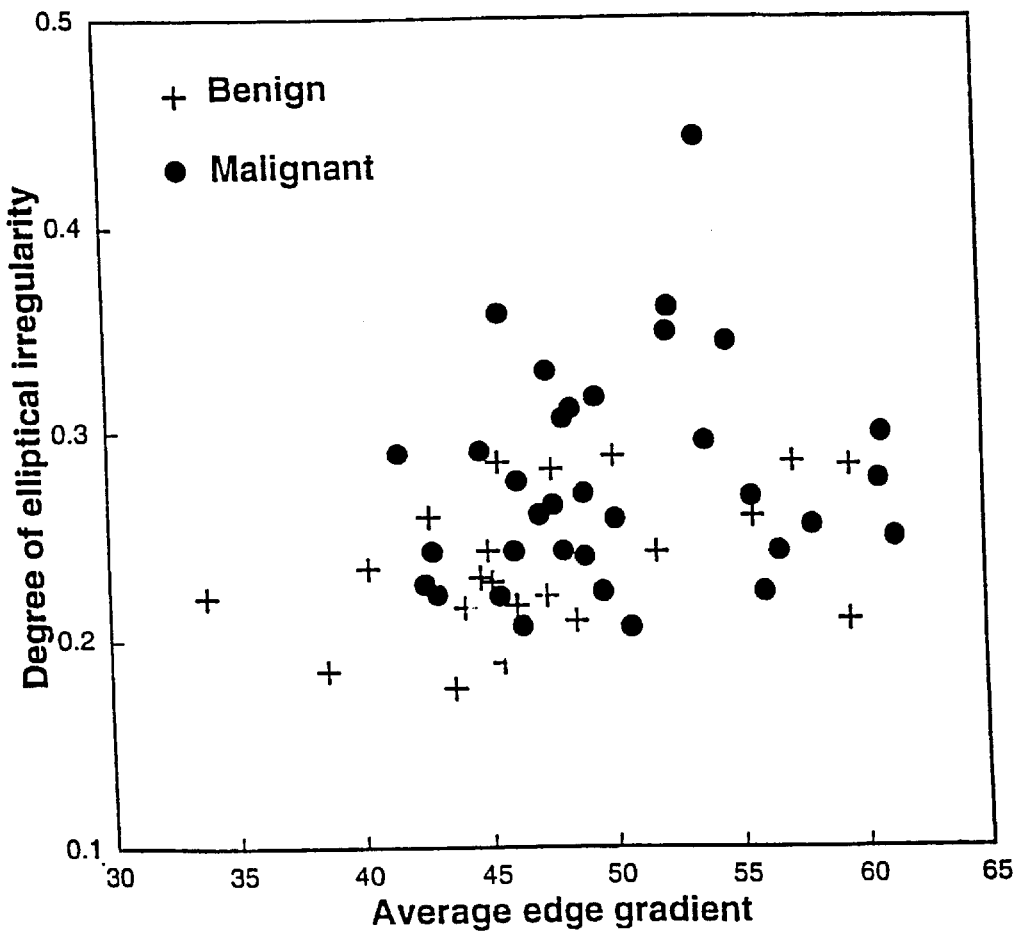

FIGS. 7(a), 7(b), and 7(c) each show the relationships between two selected image features of pulmonary nodules. Although a considerable overlap between the malignant and benign pulmonary nodules is observed in general, there is also a trend, which would discriminate malignant and benign nodules, between the distribution of two groups. For example, in FIG. 7(a) malignant nodules tend to have a larger effective diameter and smaller degree of ellipticity than benign nodules. This result appears to agree with general characteristics of lung nodules that malignant nodules are larger than benign nodules, and that the shape of benign nodules tends to be round. FIG. 7(d) shows that malignant nodules tend to have a larger average edge gradient and a larger degree of elliptical irregularity than benign nodules, which indicates potential for discriminating benign from malignant nodules. This tendency also agrees with general characteristics that malignant nodules tend to contain spiculations and irregular margins.

Performance of ANNs Trained with Objective Measures

Although all twelve objective measures could be used to distinguish benign from malignant nodules, it is desirable for ANNs to achieve a high performance when smaller numbers of input units are applied, as in the analysis of the performance of ANNs trained with subjective features. Therefore, selected subsets of features were identified from among the twelve objective physical measures and two clinical parameters, using a genetic algorithm [40]. Note, however, that patient's age and nodule size were always included as selected features, because these two features are considered to be among the most important in differentiating pulmonary nodules [15, 16]. Table 5 shows the results of different combinations of clinical parameters and objective measures quantified by computer, that resulted in high values of Az (Az>0.830) for the ANN. In Table 5, the following abbreviations are used: RMS=RMS value; FM=first moment of power spectrum; TGI=tangential gradient index; RGI=radial gradient index; LEI=line enhancement index; AG=average gradient; STD=standard deviation of pixel value; and APV=average pixel value.

TABLE 5

| Features | Az Value |
|---|---|
| Age, Size, Ellipticity, FM, AG | 0.854 |
| Age, Size, RMS, FM, TGI | 0.851 |
| Age, Size, Circularity, TGI, APV, STD | 0.846 |
| Age, Size, Circularity, Ellipticity, TGI, APV | 0.842 |
| Age, Size, Circularity, RMS, FM, APV | 0.837 |
| Age, Size, Irregularity, TGI, RGI, LEI, AG | 0.831 |

Figure 8:
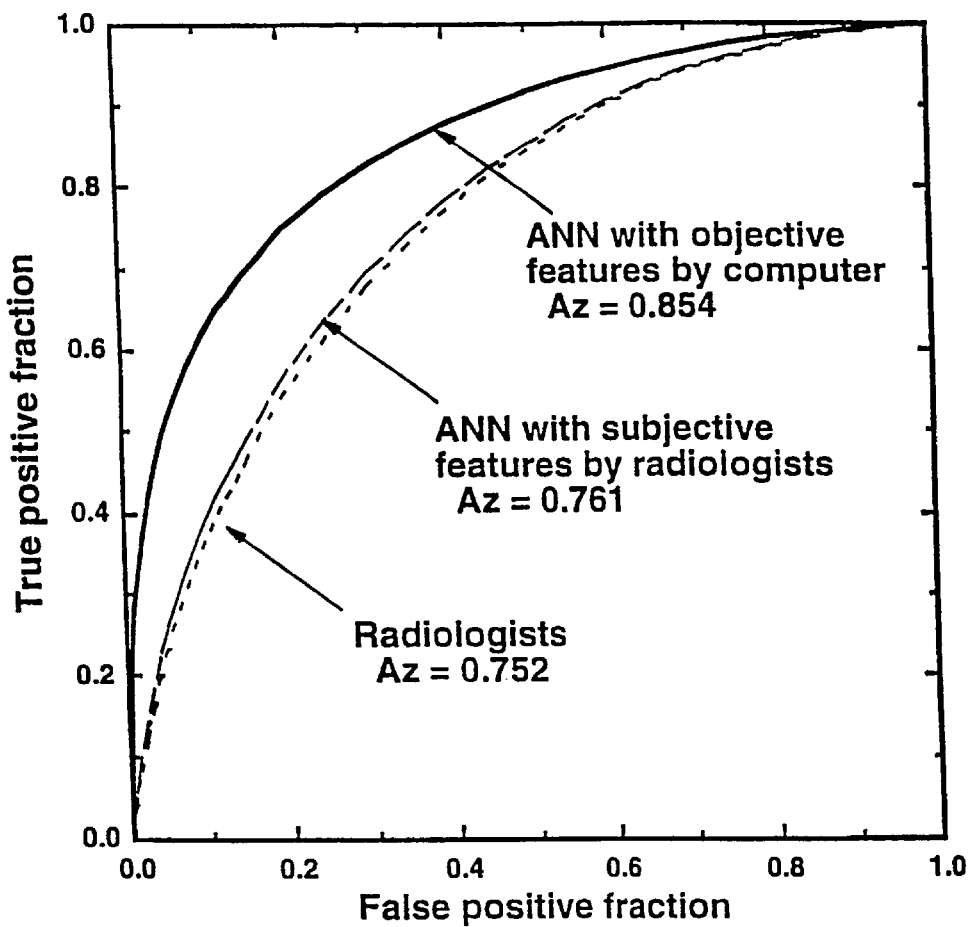
FIG. 8 is a graph of a series of ROC curves showing that an ANN trained with objective measures quantified by a computer outperforms both radiologists and an ANN trained with subjective features quantified by radiologists, when distinguishing between benign and malignant nodules.

FIG. 8 shows the comparison of ROC curves corresponding to: (1) the ANN with the computer extracted features, (2) the ANN with six selected subjective ratings by radiologists, and (3) the radiologists. The results indicated that the ANN trained with features obtained with computer analysis performed better (based on Az) than both the radiologists and the ANN trained with subjective features.

In this study the computer analysis was performed based on nodule outlines drawn by a radiologist, which is subjective. Therefore, the nodule outlines drawn by another radiologist were examined, and it was confirmed that the ANN with another set of computer extracted (quantified) features provided a comparable or a higher performance (Az=0.920).

Discussion

The performance of ANNs trained with subjective ratings by radiologists was better than that by radiologists themselves in distinguishing benign from malignant pulmonary nodules. Similar results were reported in studies on differential diagnosis of breast cancer [22, 23] and also interstitial lung diseases [40]. This may be because radiologists would not use all of the image features, which were obtained in subjective ratings in this study in their differential diagnosis of solitary pulmonary nodules. For example, due to their knowledge and own experience, a limited number of conspicuous features are likely to affect strongly their decision making in some cases, and radiologists generally tend not to consider all of features systematically. On the other hand, ANNs are affected by all of the data consistently and comprehensively. In addition, ANNs are superior to radiologists in merging large amounts of data.

An ANN has a unique capability to learn specific patterns between input and output data if the ANN is trained by examples repeatedly; however, this capability strongly depends on the quality of the input data. In other words, if input data are selected randomly and have no correlation with output data, the ANN is unlikely to learn any specific patterns between input and output data, resulting in a lower performance. There was a considerable variation among the performances of ANN with subjective ratings given by each radiologist. This seems to indicate a large variation of subjective ratings by radiologists. Although images were provided as a guide to radiologists to use the criterion consistently for extracting subjective image features, the ratings are highly subjective, and could be affected strongly by an individual radiologist's knowledge and experience, which may have caused the large variation in the ratings of the radiologists.

It is generally desirable to train an ANN with a large database that contains a wide spectrum of data. Therefore, the round-robin test using all of data by seven radiologists together was applied. Although the performance of the ANN with all data improved slightly as compared with the average performance of the ANN with each radiologist's data when all features were included, the performance with all data decreased when selected features were used. This might be due to the variation among the subjective ratings by radiologists. The feature data provided by some radiologists might have had a negative influence on the ANN for learning the pattern of the feature data provided by other radiologists.

Another limitation of using subjective ratings for input data to train and test the ANN is that the quality of subjective ratings as input data for the ANN considerably depends on the ability of a radiologist to extract or quantify nodule features. The performance of the ANN with subjective features extracted by radiology residents were much lower than that of attending radiologists, which indicates that less experienced radiologists could not extract the nodule features sufficiently, and consequently, the ANN could not learn well the specific patterns between input data and output data. Therefore, computer-aided diagnostic schemes that can extract nodule features automatically, objectively, and reproducibly are highly desirable.

The ANN having input features automatically determined by computer performed better (based on Az) than the average performance of the radiologists. Moreover, the ANN trained with features determined by computer performed better than the ANN trained with subjective features. Although the objective measures were selected initially on the basis of their expected correlation with the subjective features, these objective measures may contain different and/or additional information from the subjective features, which may explain why the objective measures contributed more effectively than the subjective features in distinguishing benign from malignant pulmonary nodules.

Since plain chest radiographs, alone, are limited in their usefulness for defining nodule morphology and classifying lung nodules, chest CT must be performed in most patients having a solitary pulmonary nodule. It should be noted, however, that the radiation exposure of a patient is inevitable with a CT examination, and moreover, a CT examination is expensive. A goal of the inventive computerized classification scheme for pulmonary nodules is to reduce the number of benign nodules sent for further diagnostic evaluation. The computerized method indicated a higher performance than the average radiologists (based on Az), even though the nodule outline was provided manually by a radiologist. Thus, the computerized classification method may provide a useful aid to radiologists in diagnosing/differentiating benign from malignant pulmonary nodules, and therefore, it may be possible to reduce the number of "unnecessary" CT examinations.

Computer and System

This invention conveniently may be implemented using a conventional general purpose computer or micro-processor programmed according to the teachings of the present invention, as will be apparent to those skilled in the computer art. Appropriate software can readily be prepared by programmers of ordinary skill based on the teachings of the present disclosure, as will be apparent to those skilled in the software art.

Figure 9:
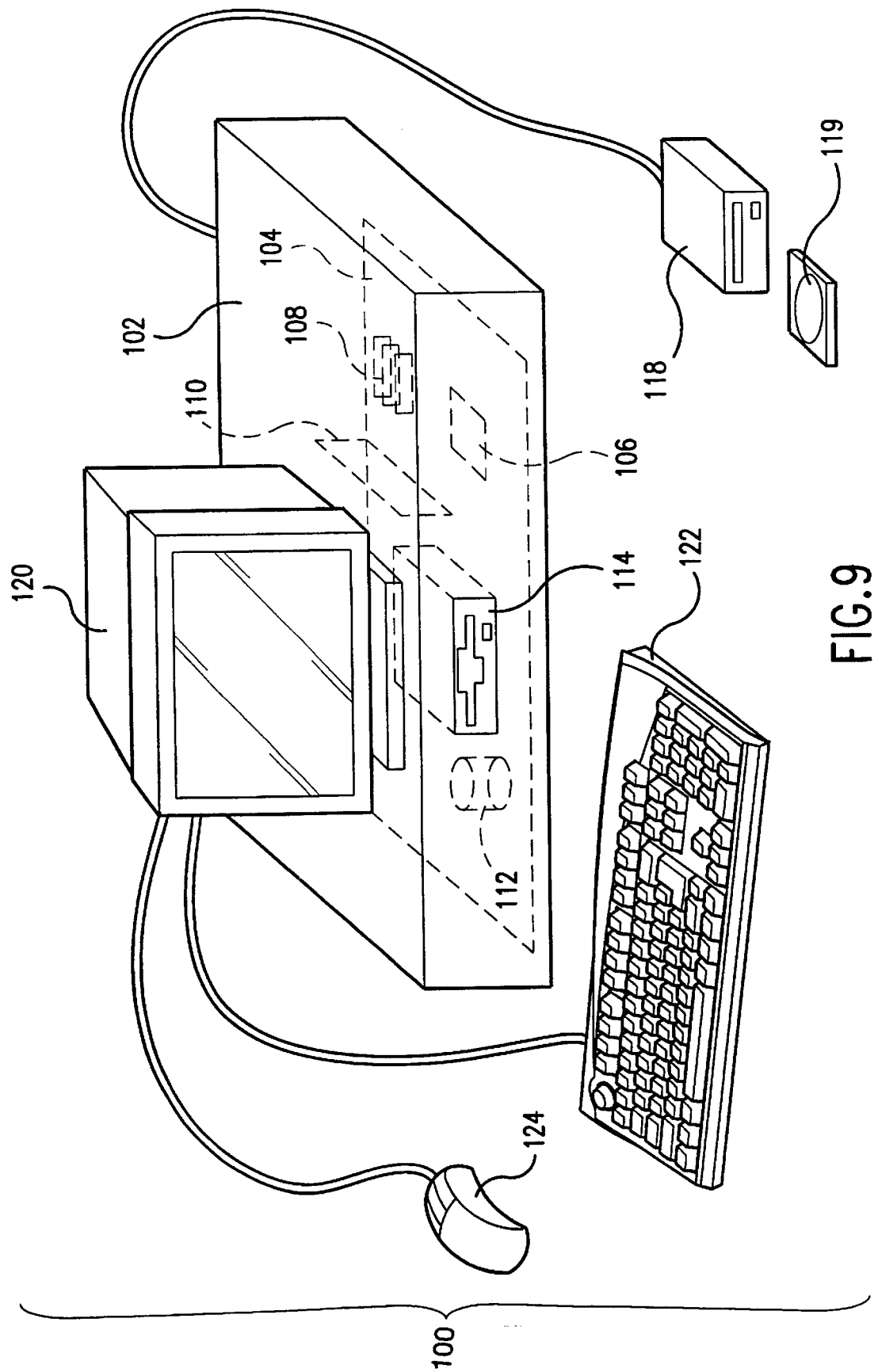
FIG. 9 is a schematic illustration of a general purpose computer 100 programmed according to the teachings of the present invention.

FIG. 9 is a schematic illustration of a computer system for the computerized analysis of the likelihood of malignancy in pulmonary nodules. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for performing the inventive method described above, including steps S1 through S7 of FIG. 1(a). The computer code devices of the present invention can be any interpreted or executable code mechanism, including but not limited to scripts, interpreters, dynamic link libraries, Java classes, and complete executable programs. Moreover, parts of the processing of the present invention may be distributed for better performance, reliability, and/or cost. For example, an outline or image may be selected on a first computer and sent to a second computer for remote diagnosis.

The invention may also be implemented by the preparation of application specific integrated circuits or by interconnecting an appropriate network of conventional component circuits, as will be readily apparent to those skilled in the art. Obviously, numerous modifications and variations of the present invention are possible in light of the above teachings. For example, the outline of the nodules may be extracted using any available automated technique, rather than manually. It is therefore to be understood that within the scope of the appended claims, the invention may be practiced otherwise than as specifically described herein.

APPENDIX

REFERENCES

[1] Webb W R. Radiologic evaluation of the solitary pulmonary nodule. AJR 1990; 154:701–708.
[2] Lillington G A. The solitary pulmonary nodule 1974. Am Rev Respir Dis 1974; 110:699–706.
[3] Ray J F, Lawton B R, Magnin G E, et al. The coin lesion story: update 1976. Twenty years experience with early thoracotomy for 179 suspected malignant coin lesions. Chest 1976; 70:332–336.
[4] Gracey D R, Byrd R B, Cagell D W. The dilemma of the asymptomatic pulmonary nodule in the young and not-so-young adult. Chest 1971; 60:479–483.
[5] Nathan M H. Management of solitary pulmonary nodules. An organized approach based on growth rates and statistics. JAMA 1974; 227:1141–1144.
[6] Lillington G A, Stevens G M. The solitary nodule. The other side of the coin. Chest 1976; 70:322–323.
[7] Cortese D A. Solitary pulmonary nodule. Observe, operate, or what? Chest 1982; 81:662–663.
[8] Lillington G A. Pulmonary nodules: solitary and multiple. Clin Chest Med 1982; 3:361–367.
[9] Khouri N F, Meziane M A, Zerhouni E A, Fishman E K. The solitary pulmonary nodule: assessment, diagnosis, and management. Chest 1987; 91:128–133.
[10] Bateson E M. An analysis of 155 solitary lung lesions illustrating the differential diagnosis of mixed tumors of the lung. Clin Radiol 1965; 16:51–65.
[11] Edwards W M, Cox R S Jr, Garland L H. The solitary nodule (coin lesion) of the lung: an analysis of 52 consecutive cases treated by thoracotomy and a study of preoperative diagnostic accuracy. AJR 1962; 88:1020–1042.
[12] Toomes H. Delphendahl A, Manke H-G, Vogt-Moydopf I. The coin lesion of the lung. A review of 955 resected coin lesions. Cancer 1983; 51:534–537.
[13] Keagy B A, Starek P J K, Murray G F, Battaglini J W, Lores M E, Wilcox B R. Major pulmonary resection for suspected but unconfirmed malignancy. Ann Thorac Surg 1984; 38:314–316.
[14] Daly B D T, Faling L J, Dichl J T, Bankoff M S, Gale M E. Computed tomography guided minithoracotomy for the resection of small peripheral pulmonary nodules. Ann Thorac Surg 1991; 51: 465–469.
[15] Swensen S J, Silverstein M D, Ilstrup D M, Schleck, Schleck C D, Edell E S. The probability of malignancy in solitary pulmonary nodules: application to small radiologically indeterminate nodules. Arch Intern Med 1997; 157:849–855.
[16] Cummings S R, Lillington G A, Richard R J. Estimating the probability of malignancy in solitary pulmonary nodules. Am Rev Respir Dis 1986; 134:449–452.
[17] Tab(all)Gurney J W. Determining the likelihood of malignancy in solitary pulmonary nodules with Bayesian analysts: partI. theory. Radiology 1993; 186:405–413.
[18] Gurney J W, Lyddon D M, Mckay J A. Determining the likelihood of malignancy in solitary pulmonary nodules with Bayesian analysis: part II. application. Radiology 1993; 186:415–422.
[19] Sherrier R H, Chiles C, Johnson G A, Ravin C E. Differentiation of benign from malignant pulmonary nodules with digitized chest radiographs. Radiology 1987; 162:645–649.
[20] Sasaoka S., Takabatake H., Mori M, Natori H., Abe S. Digital analysis of pulmonary nodules - potential usefulness of computer-aided diagnosis for differentiation of benign from malignant nodules - Japanese J Chest Disease 1995; 33:489–496.
[21] Asada N., Doi K., MacMahon H., et al. Potential usefulness of an artificial neural network for differential diagnosis of interstitial lung diseases: pilot study. Radiology 1990; 177: 857–860.
[22] Wu Y., Doi K., Giger M L., Nishikawa R M. Computerized detection of clustered microcalcifications in digital mammograms: application of artificial neural networks. Med Phys 1992; 19: 555–560.
[23] Wu Y., Giger M L., Doi K., Vyborny C J, Schmidt R A, Metz C E. Artificial neural networks in mammography: application to decision making in the diagnosis of breast cancer. Radiology 1993; 187:81–87.
[24] Jiang Y., Nishikawa R M, Wolverton D E, et al. Malignant and benign clustered microcalcifications: automated feature analysis and classification. Radiology 1996; 198:671–678.
[25] Ishida T., Katsuragawa S., Ashizawa K., MacMahon H., Doi K. Artificial neural networks in chest radiographs: detection and characterization of interstitial lung disease. Proc SPIE 1997; 3034:931–937.3.
[26] Gross G W, Boone J M, Greco-Hunt V, Grrenberg B. Neural networks in radiologic diagnosis: II. Interpretation of neonatal chest radiographs. Invest Radiol 1990; 25:1017–1023.
[27] Lo S C, Freedman M T, Lin J S, Mun S K. Automatic lung nodule detection using profile matching and back-propagation neural network techniques. J Digit Imaging 1993: 6:48–54.
[28] Gurney J W, Swensen S J. Solitary pulmonary nodules: determining the likelihood of malignancy with neural network analysis. Radiology 1995; 196:823–829
[29] Kobayashi T. Xu X W, MacMahon H. Metz C E, Doi K. Effect of a computer aided diagnosis scheme on radiologists' performance in detection of lung nodules on radiographs. Radiology 1996; 199:843–848.
[30] Xu X W, Doi K. Development of an improved CAD scheme for automated detection of lung nodules in digital chest images. Med Phys 1997; 24:1395–1403.
[31] Giger M L, Doi K, MacMahon H. Metz C E, Yin F F. Pulmonary nodules: computer-aided detection in digital chest images. RadioGraphics 1990; 17:861–865.
[32] Matsumoto T, Yoshimura H. Doi K, et al. Image feature analysis of false-positive diagnoses produced by automated detection of lung nodules. Invest Radiol 1992; 27:587–597.
[33] Pilu M, Fitzgibbon A, Fisher R. Ellipse-specific direct least-square fitting. IEEE international Conference on Image Processing 1996; 3:599–602.
[34] Fitzgibbon A, Pilu M, Fisher R. Direct least-square fitting of ellipses. International Conference on Pattern Recognition 1996; 1:253–257.
[35] Katsuragawa S. Doi K, Nakamori N. MacMahon H. Image feature analysis and computer-aided diagnosis in digital radiography: Effect of digital parameters on the accuracy of computerized analysis of interstitial disease in digital chest radiographs. Med Phys 1990; 17:72–78.
[36] Isihda T. Katsuragawa S. Kobayashi T. MacMahon H. Doi K. Computerized analysis of interstitial disease in chest radiographs: Improvement of geometric-pattern feature analysis. MedPhys 1997; 24:915–924.
[37] Rumelhart D E, Hinton G E, Williams R J. Learning internal representations by error propagation. In: Rumelhart D E, McClelland J L, PDP Research Group, eds. Parallel distributed processing: explorations in the microstructure of cognition. Vol 1. Cambridge, Mass: MITPress, 1986; 318–362.
[38] Metz C E. ROC methodology in radiologic imaging. Invest Radiol 1986; 21:720–733.
[39] Metz C E, Herman B A, Shen J H. Maximum-likelihood estimation of receiver operating (ROC) curves from continuously-distributed data. Statistics in Medicine (in press).
[40] Anastasio M A, Yoshida H. Nagel R. Nishikawa R M, Doi K. A genetic algorithm based method for optimizing the performance of a computer-aided diagnosis scheme for detection of clustered microcalcifications in mammograms.
[41] Ashizawa K, MacMahon H. Ishida T. Vyborny C J, Katsuragawa S. Doi K. Effect of artificial neural networks on observer performance for differential diagnosis of interstitial lung disease on chest radiographs. Radiology 1997; 205(P):529.
[42] Bick U. Giger M L, Schmidt R A, Doi K. A new single-image method for computer-aided detection of small mammographic masses. In: Lewke H U, Inamura K, Jaffe C C, Vannier M W, ed. Proc. CAR - Computer Assisted Radiology, 1995; 357–363.

What is claimed is:

1. A method for analyzing a nodule, comprising:
obtaining an image of the nodule;
obtaining a digital outline of the nodule;
generating objective measures corresponding to physical features of the nodule based on the outline, said physical features selected from the group consisting essentially of effective diameter, degree of circularity, degree of ellipticity, root mean square variation, first moment of power spectrum of a function corresponding to the distance between a calculated ellipse and the outline, degree of irregularity, average gradient, radial gradient index, tangential gradient index, line enhancement index, average pixel value, and standard deviation of pixel values;

applying the generated objective measures to an artificial neural network; and determining a likelihood of malignancy of the nodule based on an output of the artificial neural network.

2. The method of claim 1, wherein:

said step of obtaining an image of the nodule comprises obtaining a digital image of the nodule; and said step of obtaining a digital outline of a nodule comprises extracting the outline of the nodule from the digital image.

3. The method of claim 1, wherein the applying step further comprises:

applying to the artificial neural network at least one clinical parameter corresponding to the nodule.

4. The method of claim 3, wherein the step of applying the at least one clinical parameter comprises:

selecting the at least one clinical parameter from the group consisting essentially of: age and gender.

5. A method for training an artificial neural network to analyze a candidate nodule, comprising:

obtaining an image of a training nodule;

obtaining a digital outline of the training nodule;

generating objective measures corresponding to physical features of the training nodule based on the out line, said physical features selected from the group consisting essentially of effective diameter, degree of circularity, degree of ellipticity, root mean square variation, first moment of power spectrum of a function corresponding to the distance between a calculated ellipse and the outline, degree of irregularity, average gradient, radial gradient index, tangential gradient index, line enhancement index, average pixel value, and standard deviation of pixel values;

applying the generated objective measures to an artificial neural network; and training the artificial neural network to determine a likelihood of malignancy in a candidate nodule, based on the objective measures.

6. The method of claim 5, wherein:

the step of obtaining the image of the training nodule comprises obtaining a digital image of the training nodule; and the step of obtaining the outline of the training nodule comprises extracting the outline of the training nodule from the digital image.

7. The method of claim 5, wherein the training step further comprises:

training the artificial neural network based on at least one clinical parameter corresponding to the training nodule.

8. The method of claim 7, wherein the step of training the artificial neural network based on at least one clinical parameter comprises:

selecting the at least one clinical parameter from the group consisting essentially of: age and gender.

9. A system for analyzing a nodule, comprising:

a mechanism configured to obtain an image of the nodule;

a mechanism configured to obtain a digital outline of the nodule;

a mechanism configured to generate objective measures corresponding to physical features of the nodule based on the outline, said physical measures selected from the group consisting essentially of: effective diameter, degree of circularity, degree of ellipticity, root mean square variation, first moment of power spectrum of a function corresponding to the distance between a calculated ellipse and the outline, degree of irregularity, average gradient, radial gradient index, tangential gradient index, line enhancement index, average pixel value, and standard deviation of pixel values;

a mechanism configured to apply the generated objective measures to an artificial neural network; and a mechanism configured to generate objective measures corresponding to physical features of the training nodule based on the outline;

a mechanism configured to apply the generated objective measures to an artificial neural network; and a mechanism configured to train the artificial neural network to determine a likelihood of malignancy in a candidate nodule, based on the objective measures.

10. The system of claim 9, wherein:

the mechanism configured to obtain an image of the nodule comprises a mechanism configured to obtain a digital image of the nodule; and the mechanism configured to obtain the digital outline comprises a mechanism configured to extract the outline of the nodule from the digital image.

11. The system of claim 9, wherein the mechanism configured to apply the generated objective measures to the artificial neural network comprises:

a mechanism configured to apply to the artificial neural network at least one clinical parameter corresponding to the nodule.

12. The system of claim 11, wherein the mechanism configured to apply the at least one clinical parameter comprises:

a mechanism configured to select the at least one clinical parameter from the group consisting essentially of: age and gender.

13. A system for training an artificial neural network to analyze a candidate nodule, comprising:

a mechanism configured to obtain an image of a training nodule;

a mechanism configured to obtain a digital outline of a the training nodule;

a mechanism configured to generate objective measures corresponding to physical features of the training nodule based on the outline, said physical features selected from the group consisting essentially of: effective diameter, degree of circularity, degree of ellipticity, root mean square variation, first moment of power spectrum of a function corresponding to the distance between a calculated ellipse and the outline, degree of irregularity, average gradient, radial gradient index, tangential gradient index, line enhancement index, average pixel value, and standard deviation of pixel values;

a mechanism configured to apply the generated objective measures to an artificial neural network; and a mechanism configured to train the artificial neural network to determine a likelihood of malignancy in a candidate nodule, based on the objective measures.

14. The system of claim 13, wherein:

the mechanism configured to obtain an image of the training nodule comprises a mechanism configured to obtain a digital image of the training nodule; and the mechanism configured to obtain the digital outline comprises a mechanism configured to extract the outline of the training nodule from the digital image.

15. The system of claim 13, wherein the mechanism configured to train the artificial neural network comprises:

a mechanism configured to train the artificial neural network based on at least one clinical parameter corresponding to the training nodule.

16. The system of claim 15, wherein the mechanism configured to train the artificial neural network based on at least one clinical parameter comprises:

a mechanism configured to select the at least one clinical parameter from the group consisting essentially of: age and gender.

17. A computer readable medium storing computer instructions for analyzing a nodule, by performing the steps of:

obtaining an image of the nodule;

obtaining a digital outline of the nodule;

generating objective measures corresponding to physical features of the nodule based on the outline, said physical features selected from the group consisting essentially of effective diameter, degree of circularity, degree of ellipticity, root mean square variation, first moment of power spectrum of a function corresponding to the distance between a calculated ellipse and the outline, degree of irregularity, average gradient, radial gradient index, tangential gradient index, line enhancement index, average pixel value, and standard deviation of pixel values;

applying the generated objective measures to an artificial neural network; and determining a likelihood of malignancy of the nodule based on an output of the artificial neural network.

18. The computer readable medium of claim 17, wherein:

said step of obtaining an image of the nodule comprises obtaining a digital image of the nodule; and said step of obtaining an outline of the nodule comprises extracting the outline of the nodule from the digital image.

19. The computer readable medium of claim 17, wherein the applying step further comprises:

applying to the artificial neural network at least one clinical parameter corresponding to the nodule.

20. The computer readable medium of claim 19, wherein the step of applying the at least one clinical parameter comprises:

selecting the at least one clinical parameter from the group consisting essentially of: age and gender.

21. A computer readable medium storing computer instructions for training an artificial neural network to analyze a candidate nodule, by performing the steps of:

obtaining an image of a training nodule;

obtaining a digital outline of the training nodule;

generating objective measures corresponding to physical features of the training nodule based on the outline, said physical features selected from the group consisting essentially of effective diameter, degree of circularity, degree of ellipticity, root mean square variation, first moment of power spectrum of a function corresponding to the distance between a calculated ellipse and the outline, degree of irregularity, average gradient, radial gradient index, tangential gradient index, line enhancement index, average pixel value, and standard deviation of pixel values;

applying the generated objective measures to an artificial neural network; and training the artificial neural network to determine a likelihood of malignancy in a candidate nodule, based on the objective measures.

22. The computer readable medium of claim 21, wherein:

the step of obtaining an image of a training nodule comprises obtaining a digital image of the training nodule; and the step of obtaining an outline of the training nodule comprises extracting the outline of the training nodule from the digital image.

23. The computer readable medium of claim 21, wherein the training step further comprises:

training the artificial neural network based on at least one clinical parameter corresponding to the training nodule.

24. The computer readable medium of claim 23, wherein the step of training the artificial neural network based on at least one clinical parameter comprises:

selecting the at least one clinical parameter from the group consisting essentially of: age and gender.

* * * * *